US010924145B2

(12) United States Patent
Mercer et al.

(10) Patent No.: US 10,924,145 B2
(45) Date of Patent: *Feb. 16, 2021

(54) PROXIMITY-INDEPENDENT SAR MITIGATION

(71) Applicant: Microsoft Technology Licensing, LLC, Redmond, WA (US)

(72) Inventors: Sean Russell Mercer, Issaquah, WA (US); Charbel Khawand, Sammamish, WA (US); Wenkai Zhong, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/242,926

(22) Filed: Jan. 8, 2019

(65) Prior Publication Data

US 2019/0253095 A1 Aug. 15, 2019

Related U.S. Application Data

(63) Continuation of application No. 15/674,959, filed on Aug. 11, 2017, now Pat. No. 10,224,974.

(Continued)

(51) Int. Cl.

*H04W 52/18* (2009.01)
*H04B 1/3827* (2015.01)

(Continued)

(52) U.S. Cl.

CPC ............. *H04B 1/3838* (2013.01); *H01P 1/38* (2013.01); *H01P 5/18* (2013.01); *H04B 17/102* (2015.01);

(Continued)

(58) Field of Classification Search

CPC ... H04B 1/3838; H04B 17/102; H04W 52/18; H01P 1/38

(Continued)

(56) References Cited

U.S. PATENT DOCUMENTS 4,016,490 A 4/1977 Weckenmann et al.
4,729,129 A 3/1988 Koerner (Continued)

FOREIGN PATENT DOCUMENTS

CN 1179864 A 4/1998
CN 100504407 C 9/2006

(Continued)

OTHER PUBLICATIONS

Ban, et al., "A Dual-Loop Antenna Design for Hepta-Band WWAN/LTE Metal-Rimmed Smartphone Applications", in Journal of IEEE Transactions on Antennas and Propagation, vol. 63, Issue 1, Jan. 2015, 8 pages.

(Continued)

*Primary Examiner* — John J Lee
(74) *Attorney, Agent, or Firm* — Holzer Patel Drennan

(57) ABSTRACT

A radiofrequency (RF) power regulator includes a forward RF power detection circuit to detect forward RF power supplied by an RF transmitter circuit to an RF transmitting antenna. An RF power sampler is coupled to the forward RF power detector circuit and provides RF power samples of the supplied forward RF power. Multiple filters are coupled to receive the RF power samples. Each filter differently filters the received forward power samples to apply a different average power period. Each filter activates an RF power adjustment trigger signal while a time-averaged forward RF power supplied to the RF transmitting antenna satisfies a forward RF power adjustment condition for the average power period of the filter. Forward RF power adjustment (Continued)

1200

1202 Set an RF transmission power limit in a mobile device

1204 Detect RF transmission signal power of an RF signal communicated from a modem to an antenna of the mobile device 1206 Convert the detected RF signal power to a digital signal 1208 Monitor the converted digital signal 1210 Determine transmission signal conditions of the mobile device 1212 Time-average the monitored power of the digital signal 1214 Select a time-averaging filter based on the determined transmission signal conditions 1216 Initiate an adjustment of the RF transmission power of the mobile device based on the time averaged signal and the RF transmission power limit logic is coupled to filters and operable to adjust the forward RF power supplied by the RF transmitter circuit to the RF transmitting antenna based on the RF power adjustment trigger signal.

20 Claims, 18 Drawing Sheets

Related U.S. Application Data

(60) Provisional application No. 62/511,741, filed on May 26, 2017, provisional application No. 62/480,114, filed on Mar. 31, 2017.

(51) Int. Cl.
*H04B 17/10* (2015.01)
*H01P 1/38* (2006.01)
*H01P 5/18* (2006.01)
*H04W 52/34* (2009.01)
*H01Q 1/24* (2006.01)

(52) U.S. Cl.
CPC .......... *H04W 52/18* (2013.01); *H04W 52/34* (2013.01); *H01Q 1/245* (2013.01)

(58) Field of Classification Search
USPC ....... 455/522, 69, 452.1, 67.11, 73, 84, 66.1
See application file for complete search history.

(56) References Cited

U.S. PATENT DOCUMENTS 4,806,944 A 2/1989 Jacomb-Hood
5,166,679 A 11/1992 Vranish et al.
5,212,621 A 5/1993 Panter
5,408,690 A 4/1995 Ishikawa et al.
5,564,086 A 10/1996 Cygan et al.
6,178,310 B1 1/2001 Jeong, II
6,657,595 B1 12/2003 Phillips et al.
6,989,745 B1 1/2006 Milinusic et al.
7,009,944 B1 3/2006 Hulbert
7,053,629 B2 5/2006 Nevermann
7,062,288 B2 6/2006 Raaf et al.
7,071,776 B2 7/2006 Forrester et al.
7,124,193 B1 10/2006 Raaf et al.
7,146,139 B2 12/2006 Nevermann
7,151,382 B1 12/2006 Kean et al.
7,162,264 B2 1/2007 Vance
7,167,093 B2 1/2007 Fergusson
7,541,874 B2 6/2009 Maeda et al.
7,729,715 B2 6/2010 Love et al.
7,917,175 B2 3/2011 Song et al.
8,063,375 B2 11/2011 Cobbinah et al.
8,134,461 B2 3/2012 Van Doorn
8,208,423 B2 6/2012 Liu et al.
8,213,982 B2 7/2012 Marlett et al.
8,269,511 B2 9/2012 Jordan
8,324,549 B2 12/2012 Romero et al.
8,326,385 B2 12/2012 Brogle et al.
8,401,851 B2 3/2013 Bushey
8,417,296 B2 4/2013 Caballero et al.
8,432,322 B2 4/2013 Amm et al.
8,442,572 B2 5/2013 Borran et al.
8,466,839 B2 6/2013 Schlub et al.
8,483,632 B2 7/2013 Arsani et al.
8,515,496 B2 8/2013 Cheng et al.
8,520,586 B1 8/2013 Husted et al.
8,547,952 B2 10/2013 Liu et al.
8,548,388 B2 10/2013 Chiu et al.
8,559,999 B2 10/2013 Hu et al.
8,565,205 B2 10/2013 Ho et al.
8,577,289 B2 11/2013 Schlub et al.
8,630,596 B2 1/2014 Harel et al.
8,723,531 B2 5/2014 Harrison
8,723,749 B2 5/2014 Lin et al.
8,775,103 B1 7/2014 Jayaraj et al.
8,781,437 B2 7/2014 Ngai et al.
8,792,930 B1 7/2014 Gopalakrishnan et al.
8,798,695 B1 8/2014 Zheng et al.
8,860,526 B2 10/2014 Manssen et al.
8,922,443 B2 12/2014 Zhu et al.
8,975,903 B2 3/2015 Salter et al.
9,093,752 B2 7/2015 Yarga et al.
9,325,355 B2 4/2016 Pecen et al.
9,337,833 B2 5/2016 Siska
9,466,872 B2 10/2016 Sanchez et al.
9,531,420 B1 12/2016 Prendergast et al.
2002/0009976 A1 1/2002 Rashidi
2002/0039028 A1 4/2002 Douglas et al.
2002/0175814 A1 11/2002 Wadlow et al.
2003/0064732 A1 4/2003 McDowell et al.
2003/0064761 A1 4/2003 Nevermann
2003/0203720 A1* 10/2003 Oosawa ................ H03L 7/0891 455/84
2003/0210203 A1 11/2003 Phillips et al.
2003/0214310 A1 11/2003 McIntosh
2003/0228846 A1 12/2003 Berliner et al.
2004/0021608 A1 2/2004 Kojima et al.
2004/0075613 A1 4/2004 Jarmuszewski et al.
2004/0108957 A1 6/2004 Umehara et al.
2004/0113847 A1 6/2004 Qi et al.
2004/0160378 A1 8/2004 Abrams et al.
2004/0219893 A1* 11/2004 Takano ................ H03G 3/3047 455/114.3
2004/0222925 A1 11/2004 Fabrega-Sanchez
2005/0017906 A1 1/2005 Man et al.
2005/0093624 A1 5/2005 Forrester et al.
2005/0184914 A1 8/2005 Ollikainen et al.
2006/0244663 A1 11/2006 Fleck et al.
2007/0037619 A1 2/2007 Matsunaga et al.
2007/0111681 A1 5/2007 Alberth, Jr. et al.
2007/0120745 A1 5/2007 Qi et al.
2007/0122307 A1 5/2007 Da Costa et al.
2007/0229371 A1 10/2007 Rowell
2008/0051165 A1 2/2008 Burgan et al.
2008/0055160 A1 3/2008 Kim et al.
2008/0158065 A1 7/2008 Wee
2008/0218493 A1 9/2008 Patten et al.
2008/0254836 A1 10/2008 Qi et al.
2009/0033562 A1 2/2009 Takeuchi et al.
2009/0047998 A1 2/2009 Alberth, Jr.
2009/0230884 A1 9/2009 Van Doorn
2009/0253459 A1 10/2009 Naganuma et al.
2009/0295648 A1 12/2009 Dorsey et al.
2009/0305742 A1 12/2009 Caballero
2009/0325511 A1 12/2009 Kim
2010/0026664 A1 2/2010 Geaghan
2010/0052997 A1 3/2010 Kan et al.
2010/0056210 A1 3/2010 Bychkov et al.
2010/0067419 A1 3/2010 Liu et al.
2010/0113111 A1 5/2010 Wong et al.
2010/0234058 A1 9/2010 Hu et al.
2010/0234081 A1 9/2010 Wong et al.
2010/0279751 A1 11/2010 Pourseyed et al.
2010/0283671 A1 11/2010 Levin et al.
2010/0283691 A1 11/2010 Su et al.
2010/0317302 A1 12/2010 Greenwood et al.
2010/0321325 A1 12/2010 Springer et al.
2011/0001675 A1 1/2011 Lee
2011/0012793 A1 1/2011 Amm et al.
2011/0012794 A1 1/2011 Schlub et al.
2011/0043408 A1 2/2011 Shi et al.
2011/0063042 A1 3/2011 Mendolia et al.
2011/0117973 A1 5/2011 Asrani et al.
2011/0124363 A1 5/2011 Calvarese et al.
2011/0157077 A1 6/2011 Martin et al.
2011/0199267 A1 8/2011 Hayashi
2011/0222469 A1 9/2011 Ali et al.
2011/0250928 A1 10/2011 Schlub et al.
2011/0298669 A1 12/2011 Rao
2012/0021707 A1 1/2012 Forrester et al.
2012/0021800 A1 1/2012 Wilson et al.
2012/0023225 A1 1/2012 Imes et al.

(56) References Cited

U.S. PATENT DOCUMENTS

2012/0044115 A1 2/2012 McCaughey et al.
2012/0071195 A1 3/2012 Chakraborty et al.
2012/0074961 A1 3/2012 Herrmann
2012/0077538 A1 3/2012 Yun
2012/0108188 A1* 5/2012 Matsumoto .......... H03F 1/0211 455/118
2012/0133561 A1 5/2012 Konanur et al.
2012/0147801 A1 6/2012 Ho et al.
2012/0164962 A1 6/2012 Lin et al.
2012/0172079 A1 7/2012 Baldemair et al.
2012/0178494 A1 7/2012 Haim et al.
2012/0190398 A1 7/2012 Leukkunen
2012/0214422 A1 8/2012 Shi et al.
2012/0223865 A1 9/2012 Li et al.
2012/0231784 A1 9/2012 Kazmi
2012/0270519 A1 10/2012 Ngai et al.
2012/0270592 A1 10/2012 Ngai et al.
2012/0276861 A1 11/2012 Isobe et al.
2012/0295554 A1 11/2012 Greene et al.
2012/0298497 A1 11/2012 Maeda et al.
2012/0299772 A1 11/2012 Shtrom et al.
2012/0315847 A1 12/2012 Li et al.
2012/0329517 A1 12/2012 Elin
2012/0329524 A1 12/2012 Kent et al.
2013/0005413 A1 1/2013 Brogle et al.
2013/0016621 A1 1/2013 Kil et al.
2013/0026846 A1 1/2013 Gianesello et al.
2013/0033400 A1 2/2013 Chiang
2013/0045700 A1 2/2013 Stallman et al.
2013/0050046 A1 2/2013 Jarvis et al.
2013/0051261 A1 2/2013 Kazmi et al.
2013/0060517 A1 3/2013 Sanchez
2013/0120257 A1 5/2013 Park et al.
2013/0122827 A1 5/2013 Ali et al.
2013/0127677 A1 5/2013 Lin et al.
2013/0137487 A1 5/2013 Sato
2013/0149957 A1 6/2013 Desclos et al.
2013/0157564 A1 6/2013 Curtis et al.
2013/0169348 A1 7/2013 Shi
2013/0178167 A1 7/2013 Lockerbie et al.
2013/0178174 A1 7/2013 Geris et al.
2013/0203363 A1 8/2013 Gratt et al.
2013/0210477 A1 8/2013 Peter
2013/0217342 A1 8/2013 Abdul-gaffoor et al.
2013/0241670 A1 9/2013 Mikhemar et al.
2013/0278474 A1 10/2013 Lenormand et al.
2013/0293244 A1 11/2013 Leek
2013/0300618 A1 11/2013 Yarga et al.
2013/0310105 A1 11/2013 Sagae et al.
2013/0310106 A1 11/2013 Wang et al.
2013/0314365 A1 11/2013 Woolley et al.
2013/0335291 A1 12/2013 Judson et al.
2014/0015547 A1 1/2014 Bottomley et al.
2014/0015595 A1 1/2014 Van Ausdall et al.
2014/0021801 A1 1/2014 Kao et al.
2014/0071008 A1 3/2014 Desclos et al.
2014/0078094 A1 3/2014 Yang
2014/0087663 A1 3/2014 Burchill et al.
2014/0280450 A1 3/2014 Luna
2014/0098491 A1 4/2014 Wang
2014/0098693 A1 4/2014 Tabet et al.
2014/0066124 A1 5/2014 Novet
2014/0128032 A1 5/2014 Muthukumar
2014/0139380 A1 5/2014 Ouyang et al.
2014/0141733 A1 5/2014 Wong et al.
2014/0152121 A1 6/2014 Ku
2014/0155000 A1 6/2014 Erkens
2014/0159980 A1 6/2014 Finegold
2014/0173269 A1 6/2014 Varoglu et al.
2014/0176938 A1 6/2014 Yang et al.
2014/0177371 A1 6/2014 Abbasi et al.
2014/0206297 A1 7/2014 Schlub et al.
2014/0253392 A1 9/2014 Yarga et al.
2014/0274188 A1 9/2014 Thorson
2014/0274189 A1 9/2014 Moller et al.
2014/0292587 A1 10/2014 Yarga et al.
2014/0307570 A1 10/2014 Hong
2014/0315592 A1 10/2014 Schlub et al.
2014/0357207 A1 12/2014 Ma
2014/0357313 A1 12/2014 Mercer et al.
2014/0370929 A1 12/2014 Khawand et al.
2015/0022206 A1 1/2015 Adolf et al.
2015/0031408 A1 1/2015 Kalla et al.
2015/0053575 A1 2/2015 Bridges et al.
2015/0141080 A1 5/2015 Standing
2015/0169093 A1 6/2015 Nakao
2015/0177371 A1 6/2015 Abbasi et al.
2015/0199042 A1 7/2015 Standing et al.
2015/0200444 A1 7/2015 Mercer et al.
2015/0201385 A1 7/2015 Mercer et al.
2015/0201387 A1 7/2015 Khawand et al.
2015/0227252 A1 8/2015 Ivanov et al.
2015/0288074 A1 10/2015 Harper et al.
2015/0382307 A1 12/2015 Harper et al.
2016/0028234 A1* 1/2016 Watanabe ............. G05B 15/02 700/291
2016/0049978 A1 2/2016 Mercer et al.
2016/0098053 A1 4/2016 Khawand et al.
2016/0164563 A1 6/2016 Khawand et al.
2016/0064801 A1 7/2016 Lee et al.
2016/0204836 A1 7/2016 Lee et al.
2016/0209962 A1 7/2016 Nurmi
2017/0082887 A1 3/2017 Kubota et al.

FOREIGN PATENT DOCUMENTS

CN 102064812 A 5/2011
CN 102077234 A 5/2011
CN 202276339 U 6/2012
CN 102714346 A 10/2012
CN 103248747 A 8/2013
CN 103931051 A 7/2014
CN 104170265 A 11/2014
CN 104224181 A 12/2014
EP 0843421 5/1998
EP 1298809 4/2003
EP 1469550 A3 12/2004
EP 1732167 A1 12/2006
EP 2015548 B1 2/2010
EP 2276108 A1 1/2011
EP 2381527 A1 10/2011
EP 2383364 A1 11/2011
EP 2405534 A1 1/2012
EP 2410661 1/2012
EP 2509229 A1 10/2012
EP 2568605 A1 3/2013
EP 2787780 A1 10/2014
GB 2293277 A 3/1996
GB 2380359 A 4/2003
GB 2409345 A 6/2005
JP 2002043957 A 2/2002
JP 2007194995 A 8/2007
WO 9517044 A1 6/1995
WO 200042797 7/2000
WO 200148858 A3 7/2001
WO 2004015813 A1 2/2004
WO 2004091046 A1 10/2004
WO 2005018046 A1 2/2005
WO 2007043150 A1 4/2007
WO 2009149023 A1 12/2009
WO 2011051554 A1 5/2011
WO 2011058128 A1 5/2011
WO 2012152103 A1 2/2012
WO 2012061582 5/2012
WO 2012091651 7/2012
WO 2012113754 8/2012
WO 2012122113 A1 9/2012
WO 2012122116 A1 9/2012
WO 2012143936 10/2012
WO 2012176217 A1 12/2012
WO 2013011352 A1 1/2013
WO 2013101106 7/2013
WO 2013103948 7/2013
WO 2013141791 A1 9/2013

(56) References Cited

FOREIGN PATENT DOCUMENTS

| | | |
|---|---|---|
| WO | 2013165419 | 11/2013 |
| WO | 2013169527 A1 | 11/2013 |
| WO | 2014036532 A1 | 3/2014 |
| WO | 2015134117 A1 | 9/2015 |
| WO | 2016111897 A1 | 7/2016 |

OTHER PUBLICATIONS

Curto, et al., "Circular Loop Antenna Operating at 434 MHz for Medical Applications: Loop-Tissue Interaction", In Proceeding of: Irish Signals and Systems Conference, Jul. 2006, 6 pages.
Chung, et al., "A dual-mode antenna for wireless charging and Near Field Communication", In Proceedings of EEE International Symposium on Antennas and Propagation & USNC/URSI National Radio Science Meeting, Jul. 24, 2015, 5 pages.
Design of Printed Trace Differential Loop Antennas, http://www.silabs.com/Support%20Documents/TechnicalDocs/AN639.pdf, Retrieved on: Nov. 17, 2016, 28 pages.
"Digital, Silicon Microphone has 2.6 X 1.6mm2 Footprint", Published on: Dec. 28, 2005, Available at: http://news.thomasnet.com/fullstory/Digital-Silicon-Microphone-has-2-6-x-1-6-mm-footprint-471386.
Hochwald, et al "Minimizing Exposure to Electromagnetic Radiation in Portable Devices", In Proceedings of Information Theory and Applications Workshop, Feb. 5, 2012, pp. 7.
Holopainen, et al., "Broadband Equivalent Circuit Model for Capacitive Coupling Element-Based Mobile Terminal Antenna", In IEEE Antennas and Wireless Propagation Letters, vol. 9, Jul. 8, 2010, 4 pages.
I.B. Bonev et al, "Parametric Study of Antenna with Parasitic Element for Improving the Hearing Aids Compatibility of Mobile Phones and the Specific Absorption Rate in the Head", Proceedings in Progress in Electromagnetics Research Symposium, Marrakesh, Morocco, Mar. 20-23, 2011, 5 pages.
"Low SAR Solution for Tablet PC", Published on: Sep. 27, 2011, Available at: http://www.auden.com.tw/TRC/webspace/disk/AudenSARSolutiondatasheet_110927.pdf.
Monebhurrun, et al., "A Novel Measurement Procedure for the Specific Absorption Rate Conformity Assessment of WiFi Devices", In Proceedings of Asia Pacific Microwave Conference, Dec. 1, 2009, pp. 401-404.
Mrazovac, "Reaching the Next Level of Indoor Human Presence Detection: An RF Based Solution", 11th International Conference on Telecommunications in Modern Satellite, Cable and Broadcasting Services, Oct. 16, 2013, 4 pages.
Mumcu, et al., "Small Wideband Double-Loop Antennas Using Lumped Inductors and Coupling Capacitors", In Journal of IEEE Antennas and Wireless Propagation Letters, vol. 10, Feb. 4, 2011, 5 pages.
Myllymaki, "Capacitive Antenna Sensor for User Proximity Recognition"; Academic dissertation to be presented with the assent of the Doctoral Training Committee of Technology and Natural Sciences of the University of Oulu for public defence in Arina-sali (Auditorium TA105), Linnanmaa, dated Nov. 30, 2012, 59 pages.
Osoinach, Bryce, "Proximity Capacitive Sensor Technology for Touch Sensing Applications", In White Paper of Proximity Sensing, 2007, 7 pages.
Ozyalcin, et al., "SAR Simulations in Wireless Communication and Safety Discussions in the Society", In Proceedings of Turkish Journal of Electrical Engineering & Computer Sciences, vol. 10, Issue 2, Dec. 31, 2013, 16 pages.
Pal, et al., "A low-profile switched-beam dual-band capacitively coupled Square Loop Antenna", In Proceedings of Antennas and Propagation Conference, Nov. 11, 2013, 5 Pages.
Pal, et al., "Dual-Band Low-Profile Capacitively Coupled Beam-Steerable Square-Loop Antenna", In Journal of IEEE Transactions on Antennas and Propagation, vol. 62, Issue 3, Mar. 2014, pp. 1204-1211.
Poutanen, "Interaction Between Mobile Terminal Antenna and User" Helsinki University of Technology Master's Thesis, Oct. 9, 2007, 100 pages.
Poutanen, et al., "Behavior of Mobile Terminal Antennas near Human Tissue at a Wide Frequency Range", In International Workshop on Antenna Technology: Small Antennas and Novel Metamaterials, Mar. 4, 2008, 4 pages.
Quddious, et al., "An inkjet printed meandered dipole antenna for RF passive sensing applications", In Proceedings of 10th European Conference on Antennas and Propagation, Apr. 2016, 4 Pages.
Rogerson, James, "Samsung reveals a folding phone-to-tablet prototype", http://www.techradar.com/us/news/phone-and-communications/mobile..nes/samsung-reveals-a-folding-phone-to-tablet-prototype-1197384,7 pages.
"SAR Evaluation Considerations for Laptop, Notebook, Netbook and Tablet Computers," Federal Communications Commission Office of Engineering and Technology Laboratory Division, May 28, 2013, 14 pages.
"Semtech Launches Smart Proximity Sensor for Short-Range Human Presence Detection & SAR Regulations in Mobile & Tablet PC Applications", Published on: Jul. 24, 2012, Available at: http://www.semtech.com/Press-Releases/2012/Semtech-Launches-Smart-Proximity-Sensor-for-Short-Range-Human-Presence-Detection-SAR-Regulations-in-Mobile-Tablet-PC-Applications.html.
Sterner, et al., "Development of an Antenna Sensor for Occupant Detection in Passenger Transportation", In Proceedings of Procedia Engineering, vol. 47, Sep. 9, 2012, 6 pages.
Toit, Riaan Du, "Using Proximity Sensing to Meet Mobile Device FCC SAR Reulations", Published on: Apr. 17, 2012, Available at: http://www.eetimes.com/General/PrintView/431201.
Office Action Issued in United Kingdom Patent Application No. 1219096.3, dated Jan. 28, 2016, 4 Pages.
Office Action Issued in Chinese Patent Application No. 201380055749.X, dated Jun. 6, 2016, 12 Pages.
Office Action Issued in Columbian Patent Application No. NC2016/0000122, dated Aug. 19, 2016, 2 Pages.
First Office Action and Search Report Issued in Chinese Patent Application No. 201480031132.9, dated Nov. 2, 2016, 10 Pages.
Office Action and Search Report Issued in Chinese Patent Application No. 201480033869.4, dated Dec. 19, 2016, 7 Pages.
"Second Office Action Issued in Chinese Patent Application No. 201380055749.X", dated Jan. 25, 2017, 10 Pages.
Office Action and Search Report Issued in Chinese Patent Application No. 201480063903.02, dated Apr. 19, 2017, 11 Pages.
Second Office Action and Search Report Issued in Chinese Patent Application No. 201580054069.5, dated Jun. 4, 2018, 6 Pages.
International Searching Authority, United States Patent and Trademark Office, International Search Report and Written Opinion for Application No. PCT/US2013/066441, dated Dec. 12, 2013, 12 Pages.
International Searching Authority, United States Patent and Trademark Office, International Search Report and Written Opinion for Application No. PCT/US2014/042023, dated Aug. 29, 2014, 11 Pages.
International Searching Authority, United States Patent and Trademark Office, International Search Report and Written Opinion for Application No. PCT/US2014/039479, dated Sep. 19, 2014, 11 Pages.
International Searching Authority, United States Patent and Trademark Office, Search Report and Written Opinion for PCT/US2014/065856, dated Feb. 4, 2015, 10 pages.
International Preliminary Examining Authority, "Second Written Opinion", Application No. PCT/US2014/042023, dated Mar. 2, 2015, 6 Pages.
International Searching Authority, U.S. Patent and Trademark Office, International Search Report for PCT/US2014/072411, dated Mar. 27, 2015, 10 pages.
International Searching Authority, United States Patent and Trademark Office, International Search Report and Written Opinion for Application No. PCT/US2014/072412, dated Mar. 30, 2015, 12 Pages.

(56) References Cited

OTHER PUBLICATIONS

International Searching Authority, United States Patent and Trademark Office, International Search Report and Written Opinion for Application No. PCT/US2014/072414, dated Apr. 14, 2015, 9 Pages.
International Preliminary Examining Authority, United States Patent and Trademark Office, International Preliminary Report on Patentability, Application No. PCT/US2013/066441, dated May 7, 2015, 9 pages.
International Searching Authority, United States Patent and Trademark Office, International Preliminary Report on Patentability, Application No. PCT/US2014/039479, dated Jun. 15, 2015, 8 pages.
International Searching Authority, U.S. Patent and Trademark Office, International Search Report and Written Opinion for PCT/US2014/072413, dated Jul. 16, 2015, 16 pages.
International Searching Authority, U.S. Patent and Trademark Office, International Search Report and Written Opinion for PCT /US2015/037563, dated Aug. 31, 2015, 11 pages.
International Searching Authority, United States Patent and Trademark Office, Second International Search Report and Written Opinion for PCT/US2014/072412; dated Oct. 5, 2015, 11 pages.
Second Written Opinion Issued in PCT Application No. PCT/US2014/072411, dated Nov. 26, 2015, 7 Pages.
International Searching Authority, U.S. Patent and Trademark Office, Second Written Opinion of International Preliminary Examining Authority for PCT/US2014/072412, dated Dec. 4, 2015, 5 pages.
International Searching Authority, U.S. Patent and Trademark Office, Second Written Opinion of the International Preliminary Examining Authority for PCT/US2014/072414 dated Dec. 9, 2015, 29 pages.
International Searching Authority, U.S. Patent and Trademark Office, Second Written Opinion of the International Preliminary Examining Authority for PCT/US2014/072413 dated Dec. 17, 2015, 6 pages.
International Seraching Authority, U.S. Patent and Trademark Office, International Search Report and Written Opinion for PCT/US2015/062851, dated Feb. 5, 2016, 11 pages.
International Preliminary Examining Authority, International Preliminary Report on Patentability for PCT/US2014/065856, dated Feb. 10, 2016, 14 pages.
International Searching Authority, U.S. Patent and Trademark Office, International Search Report and Written Opinion for PCT/US2015/052769, dated Feb. 17, 2016, 27 pages.
International Preliminary Report of Patentability issued in PCT Application No. PCT/US2014/072412; dated Mar. 22, 2016, 7 pages.
International Preliminary Examining Authority, International Preliminary Report on Patentability for PCT/US2014/072411; dated Mar. 23, 2016, 8 pages.
International Preliminary Examining Authority, International Preliminary Report on Patentability for PCT/US2014/072414; dated Mar. 23, 2016, 7 pages.
International Preliminary Examining Authority, International Preliminary Report on Patentability for PCT/US2014/072413, dated Mar. 24, 2016, 7 pages.
Second Written Opinion Issued in PCT Application No. PCT/US2015/052769, dated Jul. 7, 2016, 5 Pages.
International Preliminary Examining Authority, International Preliminary Report on Patentability for PCT/US2015/037563, dated Sep. 13, 2016, 11 pages.
International Preliminary Examining Authority, International Preliminary Report on Patentability for PCT/US2015/052769, dated Sep. 29, 2016, 16 pages.
"Second Written Opinion Issued in PCT Application No. PCT/US2015/062851", dated Oct. 28, 2016, 8 Pages.
Mercer, et al., "Dynamic Antenna Power Control for Multi-Context Device", U.S. Appl. No. 14/987,964, filed Jan. 5, 2016, 52 pages.
Standing, et al., "Radiofrequency-Wave-Transparent Capacitive Sensor Pad", U.S. Appl. No. 15/384,742, filed Dec. 20, 2016, 26 pages.
Harper et al., "Active Proximity Sensor With Adaptive Electric Field Control", U.S. Appl. No. 15/413,196, filed Jan. 23, 2016, 35 pages. Harper et al., "Active Proximity Sensor With Adaptive Electric Field Control", U.S. Appl. No. 15/413,196, filed Jan. 23, 2017, 35 pages.
Harper, "Loop Antenna With Integrated Proximity Sensing", U.S. Appl. No. 15/412,997, filed Jan. 23, 2017, 32 pages.
"Non-Final Office Action", U.S. Appl. No. 14/152,351, dated Feb. 20, 2015, 10 pages.
"Non-Final Office Action", U.S. Appl. No. 13/905,088, dated Mar. 23, 2015, 37 pages.
"Non-Final Office Action", U.S. Appl. No. 14/152,652, dated Jul. 16, 2015, 9 pages.
"Non-Final Office Action", U.S. Appl. No. 14/152,086, dated Jul. 22, 2015, 13 pages.
"Non-Final Office Action", U.S. Appl. No. 14/152,529, dated Sep. 22, 2015, 18 pages.
"Non-Final Office Action", U.S. Appl. No. 13/918,846, dated Sep. 23, 2015, 16 pages.
"Non-Final Office Action", U.S. Appl. No. 14/152,086, dated Nov. 30, 2015, 19 pages.
"Non-Final Office Action", U.S. Appl. No. 14/562,212, dated Dec. 18, 2015, 16 pages.
"Non-Final Office Action", U.S. Appl. No. 14/927,287, dated Dec. 21, 2015, 28 pages.
"Final Office Action", U.S. Appl. No. 14/152,652, dated Dec. 23, 2015, 9 pages.
"Non-Final Office Action", U.S. Appl. No. 14/320,320, dated Jan. 21, 2016, 9 pages.
"Non-Final Office Action", U.S. Appl. No. 14/152,529, dated Jan. 22, 2016, 18 pages.
"Final Office Action", U.S. Appl. No. 13/918,846, dated Mar. 2, 2016, 20 pages.
"Non-Final Office Action", U.S. Appl. No. 14/152,652, dated Apr. 18, 2016 9 pages.
"Final Office Action Issued in U.S. Appl. No. 14/927,287", dated May 11, 2016, 34 Pages.
"Non-Final Office Action", U.S. Appl. No. 14/086,866, dated May 19, 2016, 7 pages.
"Non-Final Office Action", U.S. Appl. No. 13/918,846, dated Jun. 14, 2016, 21 pages.
"Final Office Action", U.S. Appl. No. 14/562,212, dated Jun. 17, 2016, 17 pages.
"Non-Final Office Action", U.S. Appl. No. 14/506,478, dated Jul. 1, 2016, 10 pages.
"Final Office Action", U.S. Appl. No. 14/320,320, dated Jul. 29, 2016, 10 pages.
"Non-Final Office Action", U.S. Appl. No. 14/086,866, dated Oct. 17, 2016, 7 pages.
"Final Office Action", U.S. Appl. No. 13/918,846, dated Oct. 26, 2016, 25 pages.
"Non-Final Office Action", U.S. Appl. No. 14/987,964, dated Nov. 30, 2016, 8 pages.
International Preliminary Examining Authority, Second Written Opinion of the International Preliminary Examining Authority for PCT/2014/065856, dated Oct. 13, 2015, 6 pages.
International Preliminary Examining Authority, Second Written Opinion of the International Preliminary Examining Authority for PCT/2015/037563, dated Jun. 1, 2016, 5 pages.
International Preliminary Examining Authority, International Preliminary Report on Patentability for PCT/US2015/062851, dated Feb. 22, 2017, 19 pages.
International Searching Authority, U.S. Patent and Trademark Office, International Search Report and Written Opinion for PCT/US2016/069056, dated Mar. 31, 2017, 14 pages.
Second Written Opinion Issued in PCT Application No. PCT/US2016/069056, dated Nov. 14, 2017, 10 Pages.
International Preliminary Report on Patentability Issued in PCT Application No. PCT/US2016/069056, dated Mar. 22, 2018, 10 Pages.
International Searching Authority, U.S. Patent and Trademark Office, International Search Report and Written Opinion for PCT/US2018/012854, dated Apr. 10, 2018, 62 pages.

(56) References Cited

OTHER PUBLICATIONS

"International Search Report and Written Opinion Issued in PCT Application No. PCT/US2018/012855", dated Apr. 11, 2018, 12 Pages.
"Extended Search Report Issued in European Patent Application No. 20173565.1", dated Jul. 16, 2020, 8 Pages.
"First Office Action and Search Report Issued in Chinese Patent Application No. 201880023232.5", dated Nov. 4, 2020, 10 Pages.

* cited by examiner

900

1100

PROXIMITY-INDEPENDENT SAR MITIGATION

CROSS-REFERENCE TO RELATED APPLICATIONS

The present application is a continuation application of U.S. application Ser. No. 15/674,959 filed Aug. 11, 2017, entitled "PROXIMITY-INDEPENDENT SAR MITIGATION" which claims benefit of priority to U.S. Provisional Patent Application No. 62/480,114, entitled "SAR Mitigation Techniques Using Integrated Hardware and Algorithmic Approaches" and filed on Mar. 31, 2017, and U.S. Provisional Patent Application No. 62,511,741, entitled "SAR Mitigation Techniques Using Integrated Hardware" and filed on May 26, 2017, both of which are specifically incorporated by reference herein for all that they disclose or teach.

BACKGROUND

Communication devices often utilize proximity detection to determine when to consider specific absorption rate (SAR) radiofrequency (RF) power limits. When proximity of an object is detected, such devices determine whether to perform RF transmission power adjustments (e.g., reductions). However, proximity detection can involve sensors that occupy valuable device real estate (e.g., in a display bezel) in a communications device.

SUMMARY

Implementations described and claimed herein address the foregoing problems by providing a radiofrequency (RF) power regulator. The RF power regulator includes a forward RF power detection circuit operable to detect forward RF power supplied by an RF transmitter circuit to an RF transmitting antenna. An RF power sampler is coupled to the forward RF power detector circuit and provides RF power samples of the supplied forward RF power. Multiple filters are coupled to receive the RF power samples. Each filter differently filters the received forward power samples to apply a different average power period. Each filter activates an RF power adjustment trigger signal while a time-averaged forward RF power supplied to the RF transmitting antenna satisfies a forward RF power adjustment condition for the average power period of the filter. Forward RF power adjustment logic is coupled to filters and operable to adjust the forward RF power supplied by the RF transmitter circuit to the RF transmitting antenna based on the RF power adjustment trigger signal.

Other implementations are also described and recited herein.

BRIEF DESCRIPTIONS OF THE DRAWINGS

DETAILED DESCRIPTIONS

Figure 1:
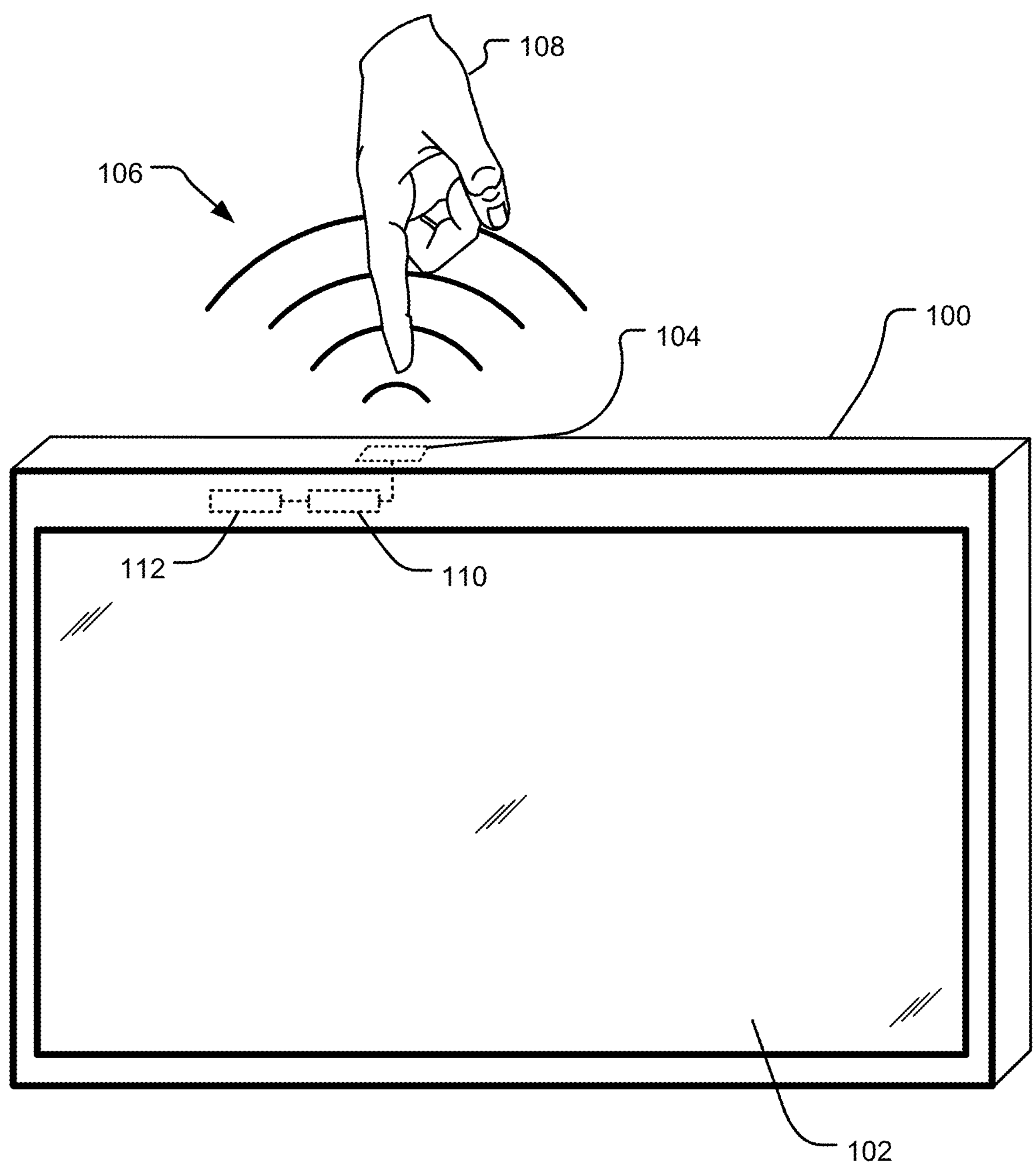
FIG. 1 illustrates an example communications device providing SAR mitigation independent of proximity detection.

Consumer electronic devices may be equipped with wireless communication circuitry emitting radio frequency (RF) electromagnetic fields that can be absorbed by human tissue positioned in close proximity to the wireless communication circuitry. For example, the wireless communications circuitry may transmit and receive RF signals in mobile telephone RF bands, LTE RF bands, Wi-Fi network RF bands, and GPS RF bands. To protect humans from harmful levels of RF radiation when using such devices, government agencies have imposed regulations limiting RF transmission power from some wireless electronic devices, such as tablet computers and mobile phones.

In some jurisdictions, specific absorption rate (SAR) standards set maximum time-averaged energy absorption limits on electronic device manufacturers. These standards impose restrictions on the time-averaged amount of electromagnetic radiation that may be emitted during a rolling time window within a given distance of a transmitting radio frequency (RF) antenna. Particular attention is given to radiation limits at distances within a few centimeters from the device (e.g., 0-3 centimeters), where users are likely to place a human body part near the transmitting antenna. For example, the U.S. Federal Communications Commission (FCC) imposes a regulation under which phones sold in the United States have an average SAR level at or below 1.6 watts per kilogram (W/kg) taken over the volume containing a mass of 1 gram of tissue that is absorbing the most signal. Different regulations may be imposed for different types of devices (e.g., phone, tablet computer) and for different body parts (e.g., torso, hands, legs) in the proximity of an RF transmitting antenna. Such restrictions may be satisfied by reducing the transmitted RF signal strength when a dielectric body (e.g., a human body part) is detected in the proximity of the transmitting antenna. Such proximity detection can be performed in a variety of ways, such as capacitive sensing or other means of measuring signal interference.

While reducing transmitted RF signal strength may enhance user safety and/or compliance with local safety regulations, significant reductions in the transmitted carrier signal strength can result in decreased device communication performance, including without limitation dropped connections (e.g., a dropped call) and/or delays in the transmission of information. Furthermore, proximity detection typically involves a sensor that occupies scarce space within a computing device.

The disclosed technology manages transmission RF signal strength to maintain device communication performance while controlling transmission energy of an electronic device to remain, on average within a rolling time window, below a predetermined safety threshold, independent of a proximity detection. The application of transmission RF power detection and intelligent attenuation triggering allows the technology to provide effective proximity-independent SAR mitigation in a communications device. Accordingly, the communications device provides improved SAR mitigation without allocating valuable space to proximity sensing structures and while maintaining effective RF signal strength for communications during various signaling conditions and use cases.

FIG. 1 illustrates an example communications device 100 providing SAR mitigation independent of proximity detection. The communications device 100 may include without limitation a tablet computer, a mobile phone, a laptop computer, a network-connected device (e.g., an Internet-of-Things ("IoT") device). In FIG. 1, the communications device 100 includes a display 102, although other implementations may or may not include such a display component.

The communications device 100 also includes a radio-frequency (RF) transmitting antenna 104, which emits a transmitted RF signal 106. Certain SAR regulations limit the time-averaged amount of transmitted RF signal energy that can be absorbed within a rolling time window by human body tissue 108 in proximity to the RF transmitting antenna 104. In the described technology, SAR regulations can be satisfied by applying fine control over the time-averaged transmission RF signal power, regardless of any proximity conditions. In other words, the communications device 100 satisfies the SAR requirements whether human body tissue is in proximity or not, thereby allowing omission of a proximity detection component in the communications device 100.

Satisfaction of the SAR requirements is managed by a forward RF power regulator 110 coupled to the RF transmitting antenna 104. The forward RF power regulator 110 monitors and manages the time-averaged amount of forward RF power supplied to the RF transmitting antenna 104 within the rolling time window specified by SAR regulations. The forward RF power regulator 110 intelligently allocates the forward RF power available within the SAR limit (or some other related threshold) and the rolling time window to maintain SAR standard compliance and device performance during operation in the time following the rolling time window.

When the forward RF power regulator 110 determines that the forward RF power should be attenuated to comply with SAR limits, the forward RF power regulator 110 triggers a forward RF power adjustment event and signals a modem 112 (e.g., including an RF transmitter circuit) that is coupled to supply forward RF power to the RF transmitting antenna 104 to reduce the supplied power. Likewise, when the forward RF power regulator 110 determines that the forward RF power should be increased when additional forward RF power is available within the rolling time window, the forward RF power regulator 110 triggers a forward RF power adjustment event and signals a modem 112 that supplies forward RF power to the RF transmitting antenna 104 to increase the supplied power.

Figure 2:
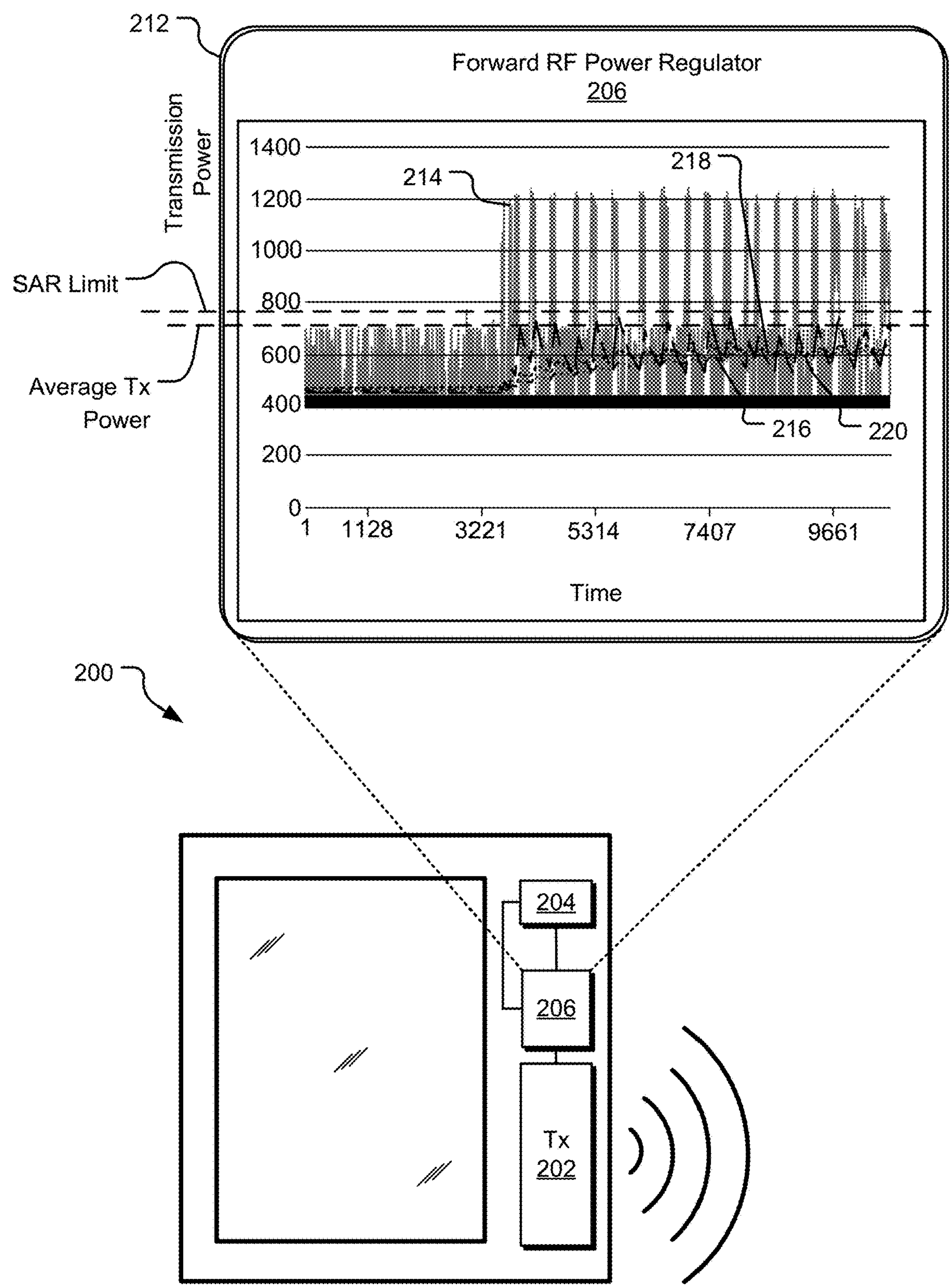
FIG. 2 illustrates an example communications device schematic for providing proximity-independent SAR mitigation.

FIG. 2 illustrates a schematic of an example communications device 200 for providing SAR mitigation. The communications device 200 determines and implements a forward RF power adjustment or attenuation function to manage a total forward RF average power so as to not exceed a predetermined average power threshold (e.g., a SAR limit). The communications device 200 may be without limitation a tablet computer, laptop, mobile phone, personal data assistant, cell phone, smart phone, Blu-Ray player, gaming system, wearable computer, home or enterprise appliance, or any other device including wireless communications circuitry for transmission of an RF carrier wave. The communications device 200 includes an RF transmitting antenna 202 that transmits an RF carrier wave. In one implementation, the carrier wave has a frequency in the range of a mobile telephone RF transmission (e.g., several hundred megahertz (MHz)). Other implementations are also contemplated. In the illustrated implementation, the communications device 200 represents a tablet computer having mobile telephone RF capabilities.

A modem 204 (e.g., including an RF transmitter circuit) supplies forward RF power to the RF transmitting antenna 202 to produce an RF carrier wave from the communications device 200. The modem 204 can transmit at a variety of different power levels and can vary the forward RF power supplied to the RF transmitting antenna 202, responsive to receipt of a power adjustment instruction from a base station (not shown). For example, a base station may instruct the communications device 200 to transmit at different power levels based on the location of the communications device 200 relative to the base station or based on a signal condition, such as an impending handoff to another base station. Under various conditions, for example, lower power levels may be suitable for communications when the communications device 200 is in close proximity to the base station, while a higher or maximum power level may be requested by the base station when the communications device 200 is further away from the base station.

A forward RF power regulator 206 also monitors the forward RF power being supplied to the RF transmitting antenna 202 and can vary the forward RF power supplied to the RF transmitting antenna 202, responsive to detection of satisfaction of a forward RF power adjustment condition. High-directivity power monitoring circuitry results in detection of power that is substantially the forward RF power supplied by the modem 204 to the RF transmitting antenna 202. In this manner, the detected power is not substantially polluted by reflected power directed back toward the modem 204 due to imperfect antenna terminating impedance. Various example high-directivity monitoring circuits are described herein, although others may be employed.

In general, the forward RF power regulator 206 monitors the forward RF power supplied to the RF transmitting antenna 202 and adjusts the forward RF power (whether up or down) when the forward RF power adjustment condition is satisfied. In one implementation, the adjustment can be made by instructing the modem 204 to adjust its output RF power to the RF transmitting antenna 202. In another implementation, the output RF power from the modem 204 can be attenuated at varying levels based on power adjustment instructions from the forward RF power regulator 206 to a power attenuator placed in the coupling between the modem 204 and the RF transmitting antenna 202. Other adjustment controls may be employed.

A "forward RF power adjustment condition" refers to a condition relating to the average transmit RF power supplied to the RF transmitting antenna 202 and its relationship to the SAR limit. The forward RF power adjustment condition, in one implementation, presents an average forward RF power limit for a given rolling time window, such as a time period set by SAR regulations. An average transmission RF power limit for the condition may be set at or below the SAR limit. Setting the average transmit RF power limit below the SAR limit provide an amount of tolerance to reduce SAR mitigation failures, although there are other approaches to avoid SAR mitigation failures (e.g., a worst-case adjustment condition that terminates transmission for a period of time if the average transmit RF power approaches or meets the SAR limit).

One implementation of the described technology employs multiple filter banks to monitor the forward RF power supplied to the RF transmitting antenna 202. Each filter bank filters at a different cut-off frequency than another filter bank and therefore applies a different average power period to the samples. If the average forward RF power is within the average power period of a filter bank (referred to as a "filter"), then the filter activates an RF power adjustment trigger signal. If the control logic selects the triggering filter, based on inputs such as network conditions and/or transmission requirements, then the trigger point control logic initiates a transmit RF power adjustment event.

As described, the forward RF power regulator 206 monitors the forward RF power supplied to the RF transmitting antenna 202 and varies the supplied power in order to maintain an average transmission power below the SAR limit within a rolling time window. The forward RF power regulator 206 can evaluate a variety of signaling condition inputs to determine when and how to adjust the supplied power, including without limitation transmitting frequency, transmitting band, modulation scheme, GPS location of the communications device 200, channel conditions (e.g., conditions relating to quality and interference in signal communications with a base station), scheduled channel activities, current channel activities, movement characteristics of the communications device 200 (such as with respect to a base station, shielding, etc.), current transmission power, distance from a base station or cell tower, etc. Accordingly, the evaluation is predictive of signaling conditions expected to be experienced by the communications device 200.

Furthermore, the forward RF power regulator 206 can evaluate a variety of transmission requirement inputs to determine when and how to adjust the supplied power, including without limitation the level of transmission activity being experienced and expected to be experienced by the communications device 200 (e.g., uploading a large data file represents a high level of transmission activity whereas downloading a large data file or handling a VOIP call represents a low level of transmission activity), the importance of successful transmission for critical transmissions (e.g., an imminent handoff to a new base station or cell tower or an Emergency 911 call), etc. Accordingly, the evaluation is predictive of recently experienced transmission activity and expected transmission requirements of the communications device 200.

Example operational characteristics of the forward RF power regulator 206 are shown in an exploded view 212. A SAR limit represents a regulatory limit for a time-averaged transmission power within a rolling time window. In various implementations, satisfaction of a forward RF power adjustment condition is achieved when a time-averaged forward RF power exceeds an average power threshold that is less than or equal to the SAR limit. It should be understood that the average power threshold of the example forward RF power adjustment condition may vary depending on network conditions, transmission requirements a selected filter bank, etc.

Actual transmission power 214 is shown in view 212, as adjusted by the RF power regulator 206. Average power monitoring results of three filter banks (fast filter 216, medium filter 218, and slow filter 220) are also shown, with the fast filter 216 detecting satisfaction of a forward RF power adjustment condition at multiple points in time (reflected by the fast filter 216 plot satisfying the forward RF power adjustment condition (e.g., average power exceeds a threshold within an average power period of the filter)). Each detected satisfaction of a forward RF power adjustment condition within the average power period of a filter results in issuance of an RF power adjustment trigger signal. If the trigger point control logic selects the triggering filter, based on inputs such as network conditions and/or transmission requirements, then the control logic initiates a transmit RF power adjustment event, represented in view 212 as an attenuation of the actual transmission power 214.

Figure 3:
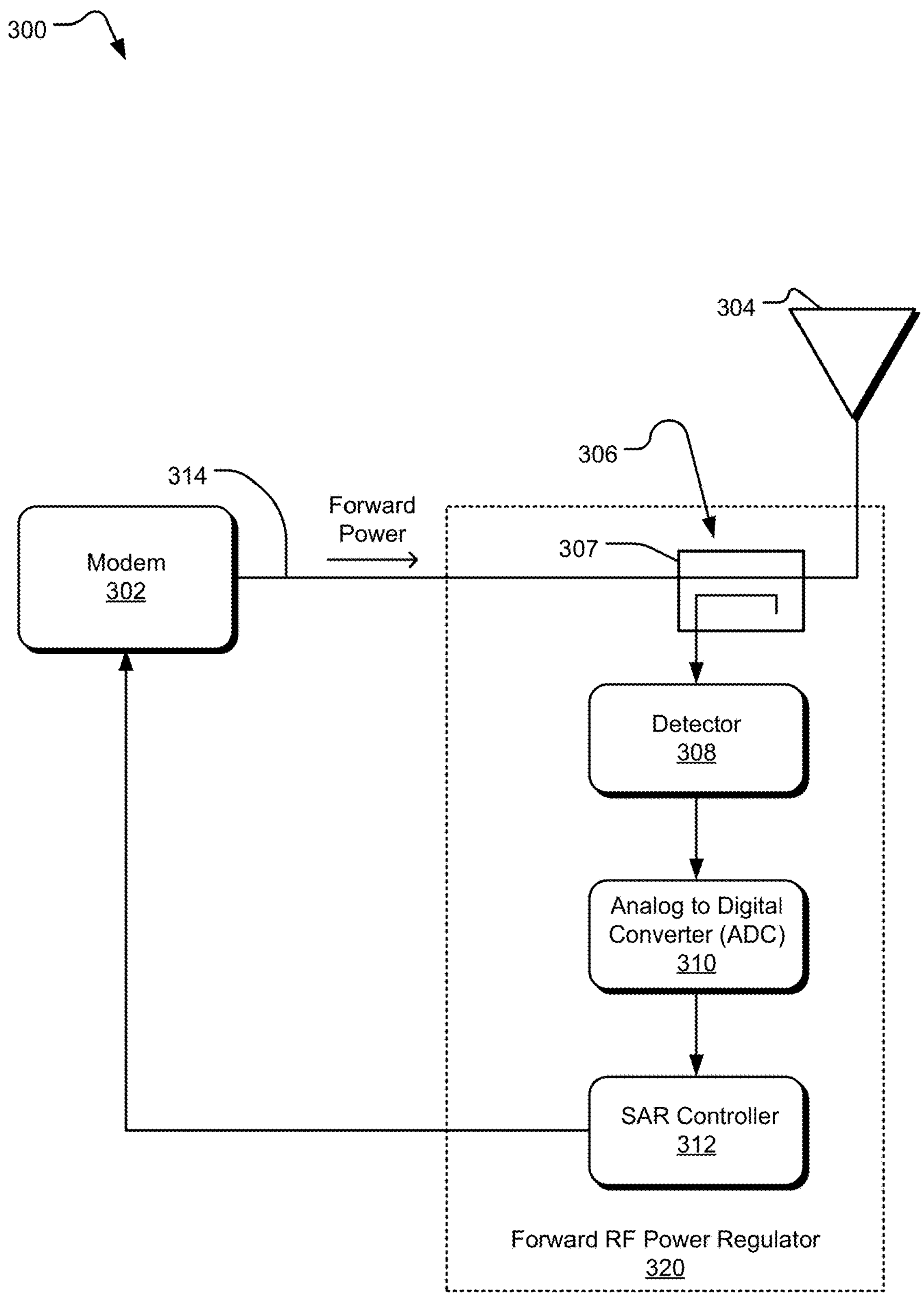
FIG. 3 illustrates an example circuit schematic for a communications subsystem implementation providing proximity-independent SAR mitigation.

FIG. 3 illustrates an example circuit schematic for a communications subsystem implementation 300 providing proximity-independent SAR mitigation. The communications subsystem implementation 300 includes a modem 302 (e.g., an RF transmitter circuit), an RF transmitting antenna 304, and a forward RF power regulator 320, which includes a forward RF power detection circuit 306. In the illustrated communications subsystem implementation 300, the forward RF power detection circuit 306 includes a directional coupler 307. The forward RF power regulator 320 also includes a detector 308, an analog-to-digital converter (ADC) 310, and a SAR controller 312. The modem 302 may include an LTE modem, a Wi-Fi radio, or other transmitting radio benefiting from RF transmit power monitoring and reduction for SAR compliance.

The forward RF power regulator 320 may be implemented in the form of a system-on-a-chip (SOC), an application-specific integrated circuit (ASIC), discrete circuitry, etc. that may be implemented with existing/future modems/antennas or integrated into such components. The direction coupler 307 may be positioned or insertable next to an antenna RF transmission line coupling (e.g., an RF transmission line coupling 314). In one implementation, the directional coupler 307 demonstrates the simultaneous properties of low insertion loss on the RF transmission line coupling 314 (antenna-to-modem) and high directivity. High directivity provides that the detected power is substantially the forward RF power transmitted from the modem 302 to the RF transmitting antenna 304 and is not substantially polluted by reflected power directed back towards the modem 302 due to imperfect antenna terminating impedance.

The output of the directional coupler 307 (e.g., a lower amplitude copy of the transmit RF power output of the modem 302) is fed to a detector circuit (e.g., the detector 308), which may be a type of root-mean-square (RMS) detector circuit. The detector circuit produces an output signal that is both:

1) Proportional to the duty cycle of the transmit signal of the modem 302 and 2) Proportional to the amplitude of the transmit signal of the modem 302.

The low-frequency output signal from the detector circuit (e.g., the detector 308) can be moved into the digital domain, for signal processing, via the ADC 310, which may be a low-cost ADC. The SAR controller 312 monitors the digitized low-frequency output signal and instructs the modem 302 to perform power adjustments for SAR compliance, when appropriate (e.g., when a forward RF power adjustment condition is satisfied). Logarithmic computation can be applied to satisfy applicable regulatory SAR paradigms. The SAR controller 312 may include hardware and/or software stored in a processor-readable medium storing processor-executable instructions for reading RF power inputs from the ADC 310 and determining whether transmit RF power adjustments are needed. The SAR controller 312 may include one or more processors, processing cores, microprocessors, etc.

In particular, SAR is a time-averaged measurement. Even though some periods of signal transmission will be at transmission power levels that exceed the allowed regulatory limit for body SAR (0 mm space, or small space e.g. 5 mm or 10 mm for some device form factors), the circuit configuration in FIG. 3 can be used to accurately monitor the average RF power over time. Computation, in near real time, provides legal compliance to time-averaged SAR. If the legal limit were to be reached, a logic signal output from the SAR controller 312 will trigger a transmit RF power adjustment event in the modem 302 or associated circuitry (e.g., an attenuation circuit at the output of the modem 302).

Figure 4:
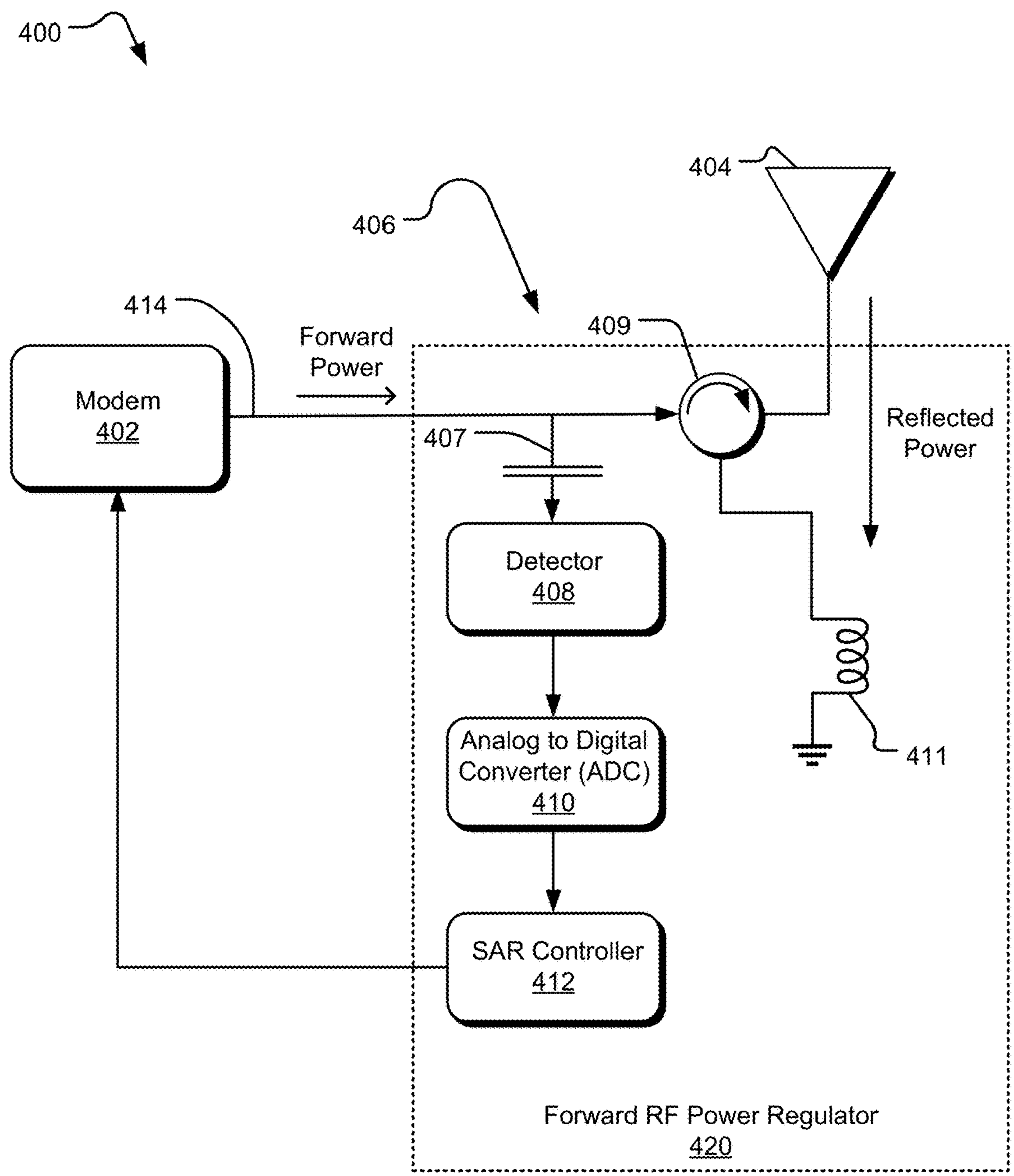
FIG. 4 illustrates an example circuit schematic of another communications subsystem implementation providing proximity-independent SAR mitigation.

FIG. 4 illustrates an example circuit schematic for another communications subsystem implementation 400 providing SAR mitigation. The communications subsystem implementation 400 includes a modem 402 (e.g., an RF transmitter circuit), an RF transmitting antenna 404, and a forward RF power regulator 420, which includes a forward RF power detection circuit 406. Specifically, FIG. 4 illustrates a hardware variant wherein the forward RF power detection circuit (e.g., the forward RF power detection circuit 306 of FIG. 3) is replaced by a forward RF power detection circuit 406 that includes a capacitive tap 407, a circulator 409, and an inductor 411 that is connected to ground. In this case, the capacitive tap 407 couples a small amount of forward RF power from the main modem-to-antenna coupling (e.g., the RF transmission line coupling 414 to an RF transmitting antenna 404) to a detector 408. The forward RF power regulator 420 also includes a detector 408, an analog-to-digital converter (ADC) 410, and a SAR controller 412. The modem 402 may include an LTE modem, a Wi-Fi radio, or other transmitting radio benefiting from RF transmit power monitoring and reduction for SAR compliance.

The output of the capacitive tap 407 (e.g., a lower amplitude copy of the transmit RF power output of the modem 402) is fed to a detector circuit (e.g., the detector 408), which may be a type of root-mean-square (RMS) detector circuit. The detector circuit produces an output signal that is both:

1) Proportional to the duty cycle of the transmit signal of the modem 402 and 2) Proportional to the amplitude of the transmit signal of the modem 402.

The position of the capacitive tap 407 (e.g., protected by the circulator 409, which directs reflected RF power through the inductor 411 to ground) substantially eliminates measurement inaccuracy risk associated with reflected power and imperfect antenna terminating impedance. The capacitive tap 407, the detector 408, an analog-to-digital converter (ADC) 410, a SAR controller 412, the circulator 409 and/or the inductor 411 may be part of a system-on-a-chip (SOC), an application-specific integrated circuit (ASIC), discrete circuitry, etc. that may be positioned on the RF transmission line coupling 414 (antenna-to-modem) to detect forward RF power supplied by the modem 402 to the RF transmitting antenna 404 and to direct the modem 402 to perform forward RF power adjustments upon satisfaction of a forward RF power adjustment condition (e.g., average power during a rolling window reaching the SAR legal limit or some related limit).

Figure 5:
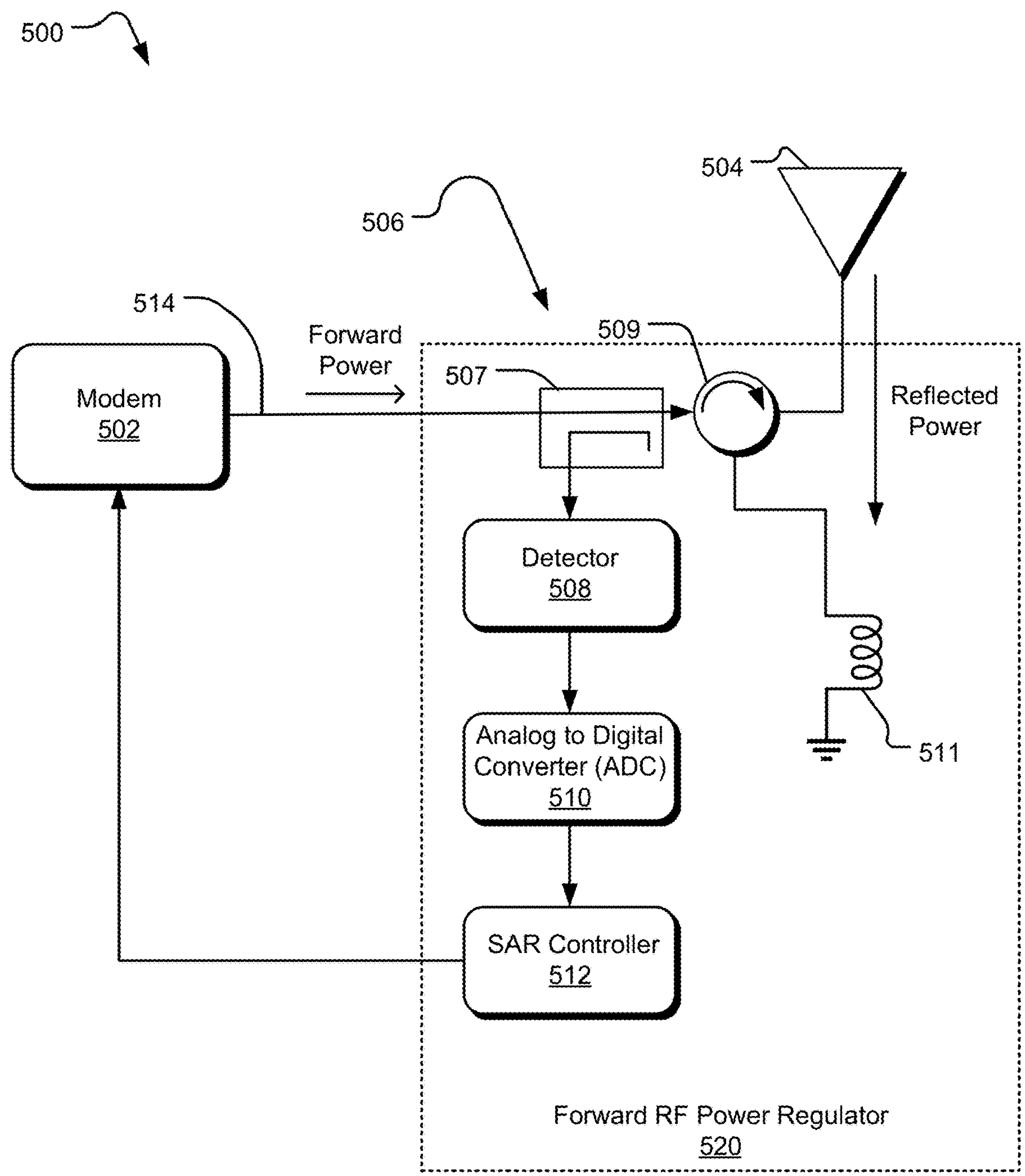
FIG. 5 illustrates an example circuit schematic for yet another communications subsystem implementation providing proximity-independent SAR mitigation.

FIG. 5 illustrates an example circuit schematic for another communications subsystem implementation 500 providing proximity-independent SAR mitigation. The communications subsystem implementation 500 includes a modem 502 (e.g., an RF transmitter circuit), an RF transmitting antenna 504, and a forward RF power regulator 520, which includes a forward RF power detection circuit 506. Specifically, FIG. 5 illustrates a hardware variant wherein the forward RF power detection circuit (e.g., the forward RF power detection circuit 306 of FIG. 3) is replaced by a forward RF power detection circuit 506 that includes a directional coupler 507, a circulator 509, and an inductor 511 that is connected to ground. The forward RF power regulator 520 also includes a detector 508, an analog-to-digital converter (ADC) 510, and a SAR controller 512. The modem 502 may include an LTE modem, a Wi-Fi radio, or other transmitting radio benefiting from RF transmit power monitoring and reduction for SAR compliance.

The position of the directional coupler 507 (e.g., protected by the circulator 509, which directs reflected RF power through the inductor 511 to ground) substantially eliminates measurement inaccuracy risk associated with reflected power and imperfect antenna terminating impedance. The forward RF power regulator 520 may be implemented in the form of a system-on-a-chip (SOC), an application-specific integrated circuit (ASIC), discrete circuitry, etc. that may be implemented with existing/future modems/antennas or integrated into such components. The direction coupler 507 may be positioned or insertable next to an antenna RF transmission line coupling (e.g., an RF transmission line coupling 514). In one implementation, the directional coupler 507 demonstrates the simultaneous properties of low insertion loss on the RF transmission line coupling 514 (antenna-to-modem) and high directivity. High directivity provides that the detected power is substantially the forward RF power transmitted from the modem 502 to the RF transmitting antenna 504 and is not substantially polluted by reflected power directed back towards the modem 502 due to imperfect antenna terminating impedance.

The output of the directional coupler 507 (e.g., a lower amplitude copy of the transmit RF power output of the modem 502) is fed to a detector circuit (e.g., the detector

508), which may be a type of root-mean-square (RMS) detector circuit. The detector circuit produces an output signal that is both:

1) Proportional to the duty cycle of the transmit signal of the modem 502 and 2) Proportional to the amplitude of the transmit signal of the modem 502.

The low-frequency output signal from the detector circuit (e.g., the detector 508) can be moved into the digital domain, for signal processing, via the ADC 510, which may be a low-cost ADC. The SAR controller 512 monitors the digitized low-frequency output signal and instructs the modem 502 to perform power adjustments for SAR compliance, when appropriate (e.g., when a forward RF power adjustment condition is satisfied). Logarithmic computation can be applied to satisfy applicable regulatory SAR paradigms. The SAR controller 512 may include hardware and/or software stored in a processor-readable medium storing processor-executable instructions for reading RF power inputs from the ADC 510 and determining whether transmit RF power adjustments are needed. The SAR controller 512 may include one or more processors, processing cores, microprocessors, etc.

In particular, SAR is a time-averaged measurement. Even though some periods of signal transmission will be at transmission power levels that exceed the allowed regulatory limit for body SAR (0 mm space, or small space e.g. 5 mm or 10 mm for some device form factors), the circuit configuration in FIG. 5 can be used to accurately monitor the average RF power over time. Computation, in near real time, provides legal compliance to time-averaged SAR. If the legal limit were to be reached, a logic signal output from the SAR controller 512 will trigger a transmit RF power adjustment event in the modem 502 or associated circuitry (e.g., an attenuation circuit at the output of the modem 502).

Figure 6:
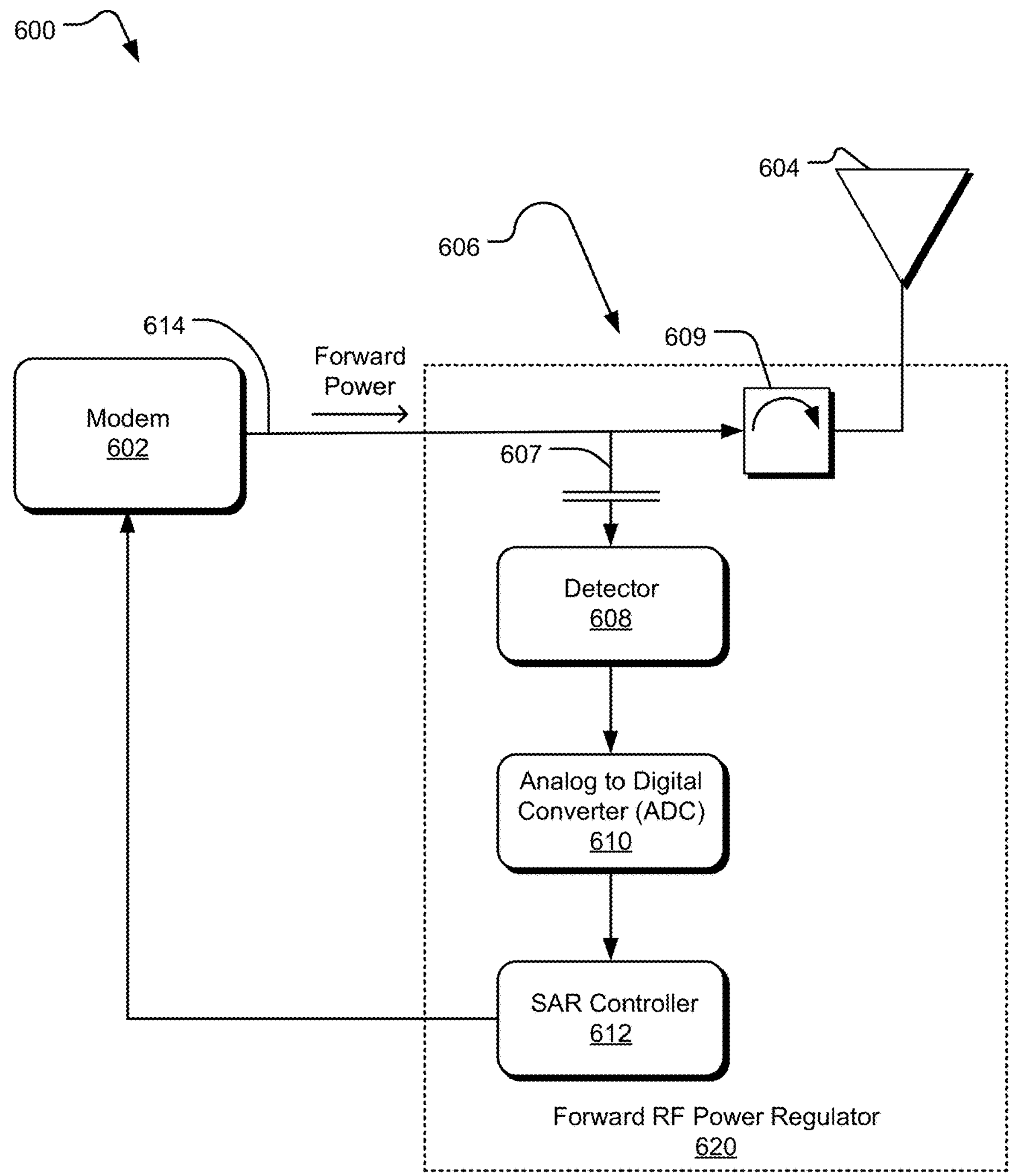
FIG. 6 illustrates an example circuit schematic for yet another communications subsystem implementation providing proximity-independent SAR mitigation.

FIG. 6 illustrates an example circuit schematic of another communications subsystem implementation 600 providing proximity-independent SAR mitigation. The communications subsystem implementation 600 includes a modem 602 (e.g., an RF transmitter circuit), an RF transmitting antenna 604, and a forward RF power regulator 620, which includes a forward RF power detection circuit 606. Specifically, FIG. 6 illustrates a hardware variant wherein the forward RF power detection circuit (e.g., the forward RF power detection circuit 306 of FIG. 3) is replaced by a forward RF power detection circuit 606 that includes a capacitive tap 607, and an isolator 609. In this case, the capacitive tap 607 couples a small amount of forward RF power from the main modem-to-antenna coupling (e.g., the RF transmission line coupling 614 to an RF transmitting antenna 604) to a detector 608. The forward RF power regulator 620 also includes a detector 608, an analog-to-digital converter (ADC) 610, and a SAR controller 612. The modem 602 may include an LTE modem, a Wi-Fi radio, or other transmitting radio benefiting from RF transmit power monitoring and reduction for SAR compliance.

The output of the capacitive tap 607 (e.g., a lower amplitude copy of the transmit RF power output of the modem 602) is fed to a detector circuit (e.g., the detector 608), which may be a type of root-mean-square (RMS) detector circuit. The detector circuit produces an output signal that is both:

1) Proportional to the duty cycle of the transmit signal of the modem 602 and 2) Proportional to the amplitude of the transmit signal of the modem 602.

The position of the capacitive tap 607 (e.g., protected by the isolator 609) substantially eliminates measurement inaccuracy risk associated with reflected power and imperfect antenna terminating impedance. The capacitive tap 607, the detector 608, an analog-to-digital converter (ADC) 610, a SAR controller 612, and/or the isolator 609 may be part of a system-on-a-chip (SOC), an application-specific integrated circuit (ASIC), discrete circuitry, etc. that may be positioned on the RF transmission line coupling 614 to detect forward RF power supplied by the modem 602 to the RF transmitting antenna 604 and to direct the modem 602 to perform forward RF power adjustments upon satisfaction of a forward RF power adjustment condition (e.g., average power during a rolling window reaching the SAR legal limit or some related limit).

Figure 7:
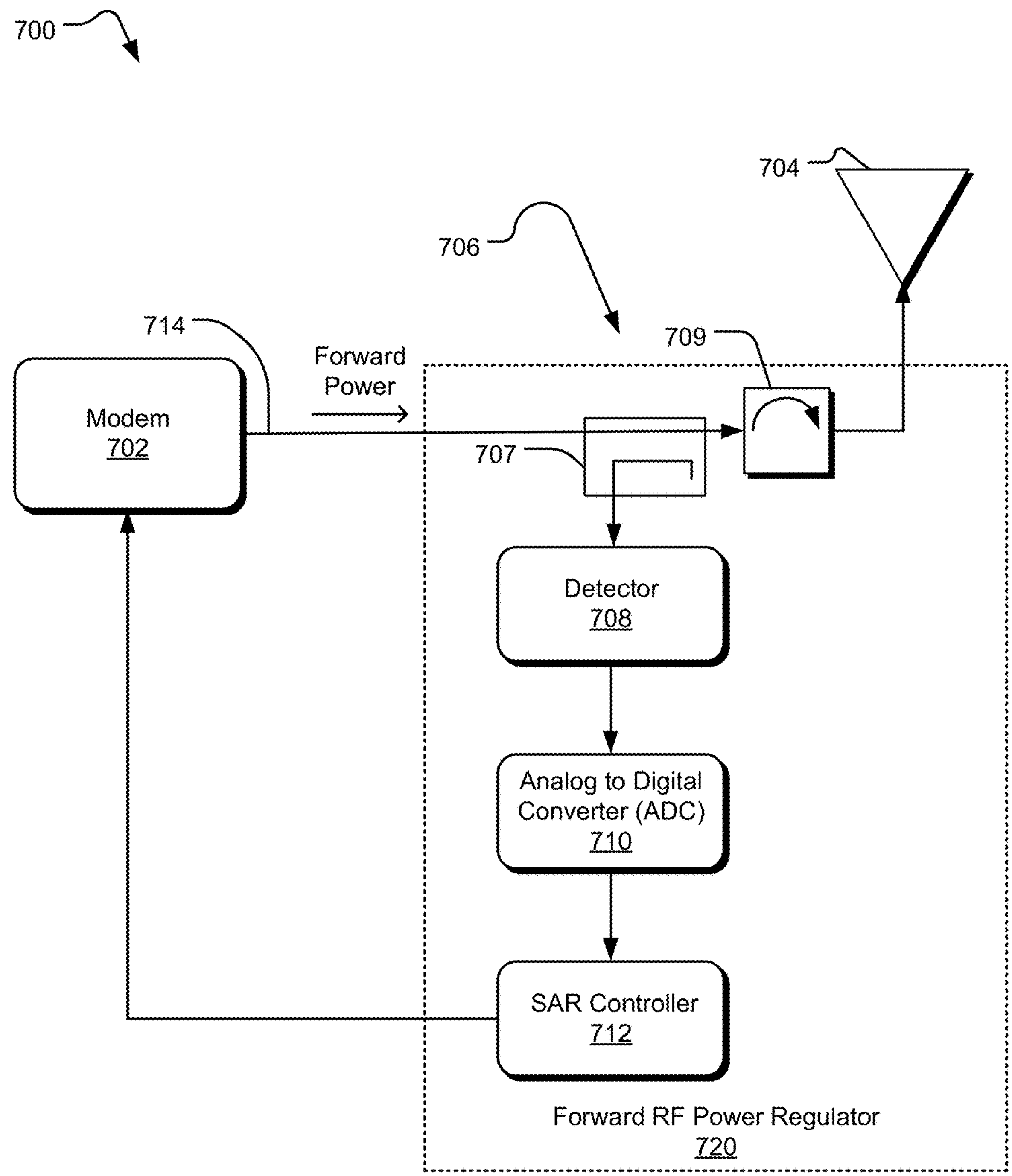
FIG. 7 illustrates an example circuit schematic for yet another communications subsystem implementation providing proximity-independent SAR mitigation.

FIG. 7 illustrates an example circuit schematic for another communications subsystem implementation 700 providing proximity-independent SAR mitigation. The communications subsystem implementation 700 includes a modem 702 (e.g., an RF transmitter circuit), an RF transmitting antenna 704, and a forward RF power regulator 720, which includes a forward RF power detection circuit 706. Specifically, FIG. 7 illustrates a hardware variant wherein the forward RF power detection circuit (e.g., the forward RF power detection circuit 306 of FIG. 3) is replaced by a forward RF power detection circuit 706 that includes a directional coupler 707 and an isolator 709. The forward RF power regulator 720 also includes a detector 708, an analog-to-digital converter (ADC) 710, and a SAR controller 712. The modem 702 may include an LTE modem, a Wi-Fi radio, or other transmitting radio benefiting from RF transmit power monitoring and reduction for SAR compliance.

The position of the directional coupler 707 (e.g., protected by the isolator 709) substantially eliminates measurement inaccuracy risk associated with reflected power and imperfect antenna terminating impedance. The forward RF power regulator 720 may be implemented in the form of a system-on-a-chip (SOC), an application-specific integrated circuit (ASIC), discrete circuitry, etc. that may be implemented with existing/future modems/antennas or integrated into such components. The direction coupler 707 may be positioned or insertable next to an antenna RF transmission line coupling (e.g., an RF transmission line coupling 714). In one implementation, the directional coupler 707 demonstrates the simultaneous properties of low insertion loss on the RF transmission line coupling 714 and high directivity. High directivity provides that the detected power is substantially the forward RF power transmitted from the modem 702 to the RF transmitting antenna 704 and is not substantially polluted by reflected power directed back towards the modem 702 due to imperfect antenna terminating impedance.

The output of the directional coupler 707 (e.g., a lower amplitude copy of the transmit RF power output of the modem 702) is fed to a detector circuit (e.g., the detector 708), which may be a type of root-mean-square (RMS) detector circuit. The detector circuit produces an output signal that is both:

1) Proportional to the duty cycle of the transmit signal of the modem 702 and 2) Proportional to the amplitude of the transmit signal of the modem 702.

The low-frequency output signal from the detector circuit (e.g., the detector 708) can be moved into the digital domain, for signal processing, via the ADC 710, which may be a low-cost ADC. The SAR controller 712 monitors the digitized low-frequency output signal and instructs the modem 702 to perform power adjustments for SAR compliance, when appropriate (e.g., when a forward RF power adjustment condition is satisfied). Logarithmic computation can be applied to satisfy applicable regulatory SAR paradigms. The SAR controller 712 may include hardware and/or software stored in a processor-readable medium storing processor-executable instructions for reading RF power inputs from the ADC 710 and determining whether transmit RF power adjustments are needed. The SAR controller 712 may include one or more processors, processing cores, microprocessors, etc.

In particular, SAR is a time-averaged measurement. Even though some periods of signal transmission will be at transmissions power levels that exceed the allowed regulatory limit for body SAR (0 mm space, or small space e.g. 5 mm or 10 mm for some device form factors), the circuit configuration in FIG. 7 can be used to accurately monitor the average RF power over time. Computation, in near real time, provides legal compliance to time-averaged SAR. If the legal limit were to be reached, a logic signal output from the SAR controller 712 will trigger a transmit RF power adjustment event in the modem 702 or associated circuitry (e.g., an attenuation circuit at the output of the modem 702).

Figure 8:
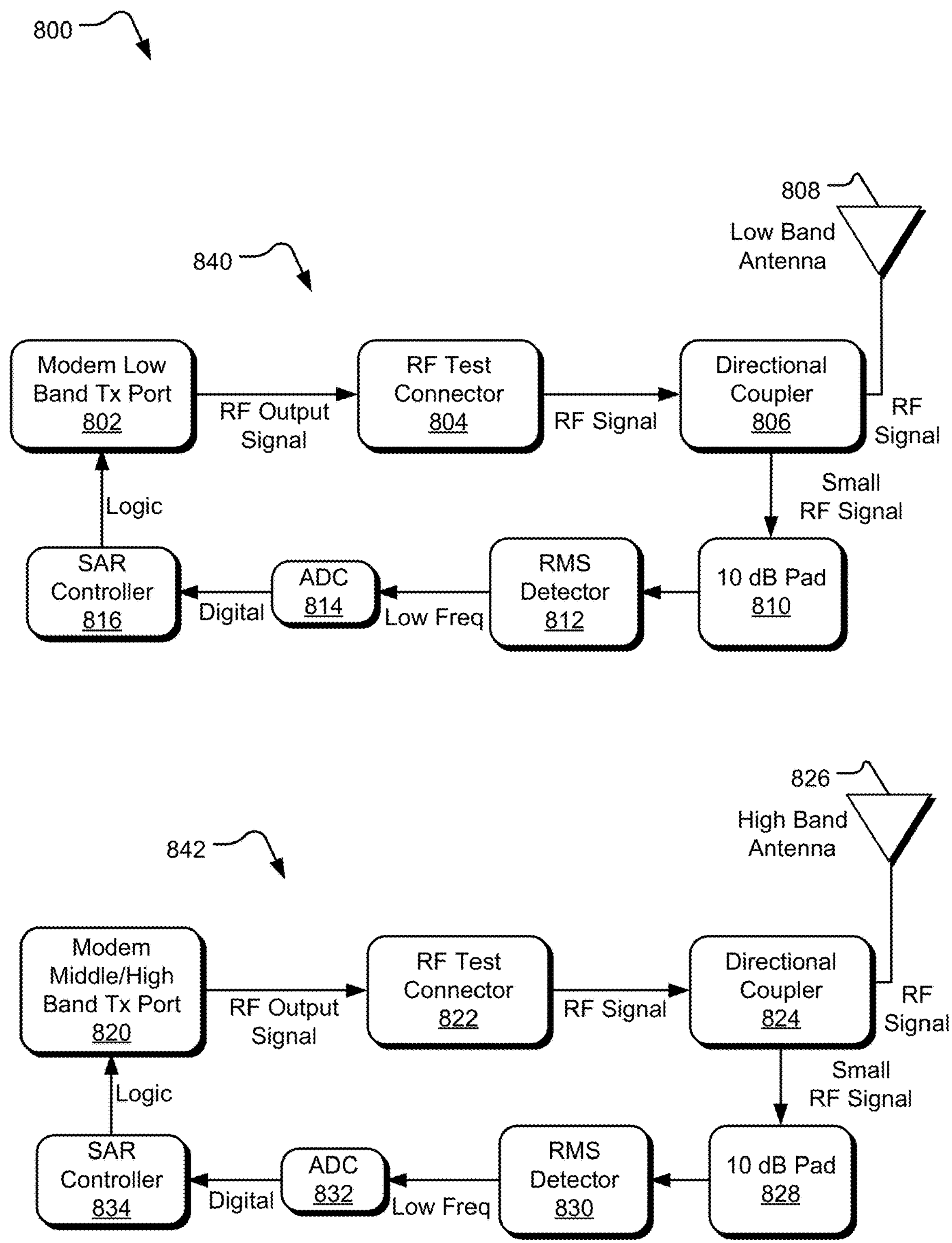
FIG. 8 illustrates example circuit schematics for multi-band transmission in a communications subsystem implementation providing proximity-independent SAR mitigation.

FIG. 8 illustrates example circuit schematics 800 for multi-band transmission in a communications subsystem implementation providing proximity-independent SAR mitigation. Specifically, FIG. 8 illustrates a low band circuit 840 for RF power detection and SAR control and a middle/high band circuit 842 for RF power detection and SAR control. The number of circuits depends on the type/amount of transmission ports for a cellular modem. For example, some modems use a low/middle/high band port, and as such, a single circuit may be used for RF power detection and SAR control. In other implementations, a modem may have a low/middle band port and a high band port. As such, an RF power detection and SAR control circuit may correspond to the low/middle band port, and an RF power detection and SAR control circuit may correspond to the high band port.

In the implementation illustrated in FIG. 8, the low band circuit 840 includes a modem low band transmission (Tx) port 802, which outputs an RF signal through an RF test connector 804 to a low band antenna 808. A directional coupler 806 (or a capacitive tap) receives some of the RF transmission power from the RF signal output from the modem low band Tx port 802. The RF signal received at the directional coupler 806 is output to a 10 dB pad 810 (or another dB pad). The RMS detector 812 receives the signal from the 10 dB pad and outputs a low-frequency signal to an analog to digital converter (ADC) 814. The ADC 814 outputs a digital signal to a SAR controller 816. The SAR controller 816 compares the detected RF power (in digital signal form) to stored patterns to determine the transmission context. Based on the determined transmission context, the SAR controller 816 determines an averaging scheme to determine average RF power over time. Based on the determined average RF power, the SAR controller 816 may recommend RF power adjustment to a modem that includes the modem low band Tx port 802.

The middle/high band circuit 842 includes a modem middle/high band transmission (Tx) port 820, which outputs an RF signal through an RF test connector 822 to a low band antenna 826. A directional coupler 824 (or a capacitive tap) receives some of the RF transmission power from the RF signal output from the middle/high band Tx port 820. The RF signal received at the directional coupler is output to a 10 dB pad 828 (or other dB pad). The RMS detector 830 receives the signal from the 10 dB pad 828 and outputs a low-frequency signal to an analog to digital converter (ADC) 832. The ADC 832 outputs a digital signal to a SAR controller 834. The SAR controller 834 compares the detected RF power (in digital signal form) to stored patterns to determine the transmission context. Based on the determined transmission context, the SAR controller 834 determines an averaging scheme to determine average RF power over time. Based on the determined average RF power, the SAR controller 834 may recommend RF power adjustment to a modem that includes the modem middle/high band Tx port 820.

In implementations, the 10 dB pad (e.g., the 10 dB pad 810 and 828) are optional and depend on the type/characteristics of connected RMS detector. In some implementations, no pad is included, and in other implementations, the characteristics of the pad are different. In some implementations, the SAR controllers 816 and 834 may be a single processing unit where determining/averaging algorithms are running and monitoring signals and making SAR adjustment recommendations. The circuits (e.g., low band circuit 840 and the middle/high band circuit 842) may include isolators and/or circulators as described above.

Figure 9:
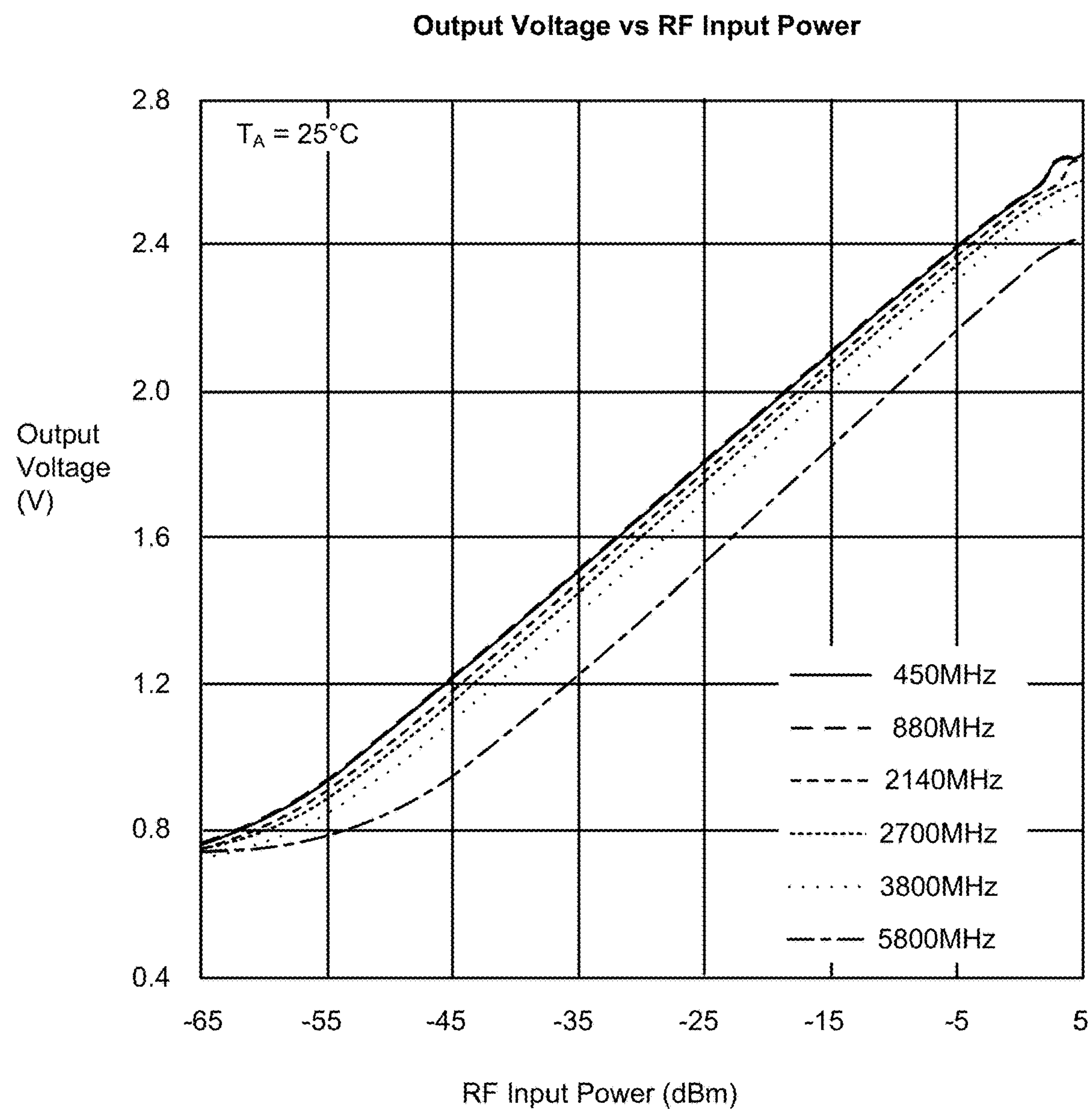
FIG. 9 illustrates example detector transfer functions.

FIG. 9 illustrates example detector transfer functions 900. Specifically, FIG. 9 illustrates example output plots of a detector (e.g., the detectors of FIGS. 3-7) in an LTE mobile device. LTE mobile devices operate and transmit accepting transmit power level instructions from the cellular network. The cell tower will instruct the mobile device to transmit at higher RF power levels when far away from the tower, and at lower RF power levels when closer to the tower. This translates to a requirement for the monitoring circuit (e.g., the detector circuit) to be able to produce an accurate output for a wide range of input RF amplitudes. FIG. 9 exposes that it is entirely possible to accurately monitor a wide range of input RF amplitudes and produce a proportional detected output signal. The detector circuit is also broadband that can function for both LTE and Wi-Fi frequency ranges.

Figure 10:
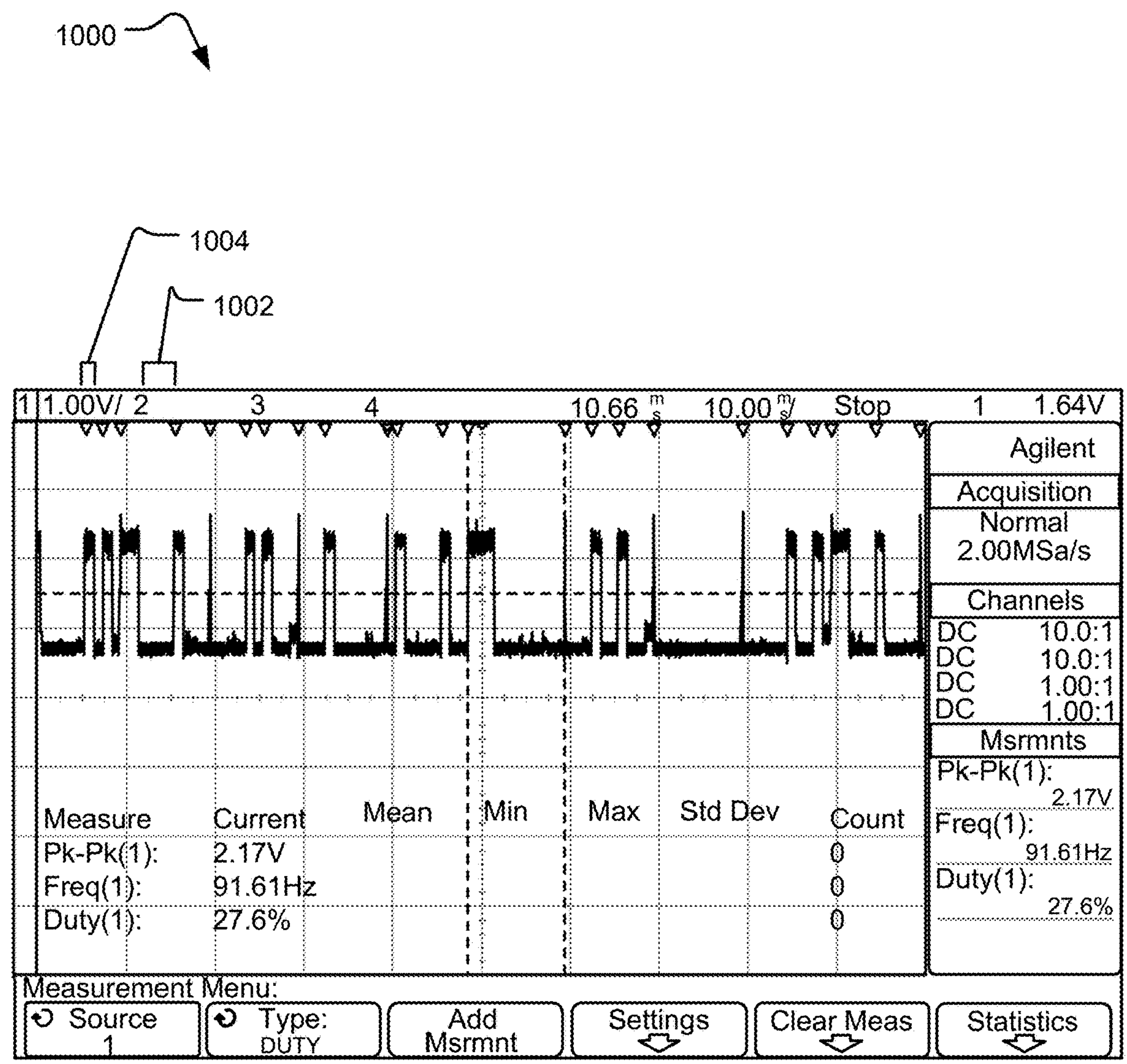
FIG. 10 illustrates an oscilloscope plot of detected LTE transmission from an LTE device using a VOIP call with normal talking speed.

FIG. 10 illustrates an oscilloscope plot 1000 of detected LTE transmission from an LTE device using a VOIP call with normal talking speed. The measured duty cycle is 27%. The detector circuit (see FIGS. 3-7) was used to monitor the LTE transmissions from a tablet device operating on a cellular network for various device use conditions. When the tablet was placed in a VOIP call, with 'normal' speech talking speed, the transmit duty cycle was approximately 27%. The modem does not transmit continuously in this operating condition. An oscilloscope was used to monitor the detector output signal for this operating condition.

The discontinuous transmission of FIG. 10 occurs during a VOIP call, averaging techniques that include the periods of non-transmission, have the potential to deliver long phone calls without applying a power adjustment at all, all while being compliant with safety requirements. The details—distance from a cell tower and the time average window specified by the regulatory agency, impact the implementation. For example, the transmission context (e.g., VOIP call) may be determined based on a comparison of the detected transmission power levels over time and an averaging scheme is determined based on the transmission context (e.g., signal conditions). The selected averaging scheme may utilize the periods of low/zero transmission (e.g., a period 1002) to offset the periods of high transmission (e.g., a period 1004) in determining transmission power over time to satisfy SAR legal limits.

Figure 11:
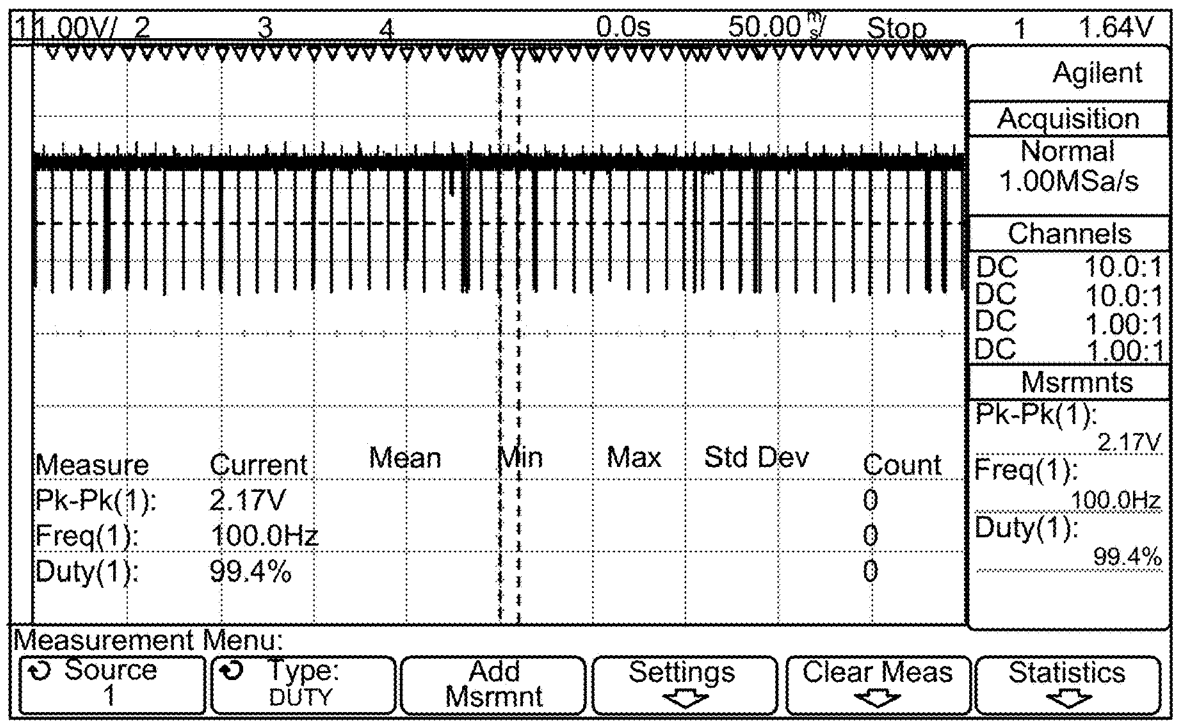
FIG. 11 illustrates an oscilloscope plot of detected LTE transmission from an LTE device that is uploading a file by email.

FIG. 11 illustrates an oscilloscope plot 1100 of detected LTE transmission from an LTE device that is uploading a file by email. The device was transmitting a large file (as an email attachment) from the tablet. The transmit duty cycle is almost 100%.

In a situation (e.g., transmission context) where the mobile device is uploading very large files for a protracted period of time while far from a cell tower (hence high transmission power), FIG. 11 illustrates that the RF output is nearly continuous (for a period) and at a high amplitude. Computational techniques applied to this signal could easily forecast when the time averaged exposure limit was being approached. Modem transmit behavior could be reduced to the safe low power level for a duration needed to maintain safety limits when modem transmit power is restored. A fast averaging scheme may be selected for the transmission context illustrated in FIG. 11. As such, any small changes in transmission power level will be used to determine the average transmission power for the satisfaction of SAR legal limits over time.

Averaging techniques (e.g., fast averaging) with a more advanced algorithmic method may invoke a smaller, less dramatic power adjustment before approaching a 'brick wall' back-off needed to observe safe limits. This more gradual application of power adjustment combines the benefits of observing safe transmission levels and providing a superior customer user experience.

The detector output waveform (e.g., FIG. 10 or FIG. 11) is a representation of the RF input waveform. A low-frequency signal is output from the detector and the signal is very well suited for low-cost signal processing, to assess RF transmit duty cycle and RF transmit power level.

The FCC discusses SAR limits as an average over an allowed period of time. Implementations described herein remove the need for instantaneous application of SAR back-off while in object proximity (e.g., using proximity detection techniques). Guaranteeing safety can then be accomplished without a proximity detection and relying more on smart averaging that can be adaptively and dynamically adjusted to satisfy FCC while eliminating the need for a proximity sensor.

Figure 12:
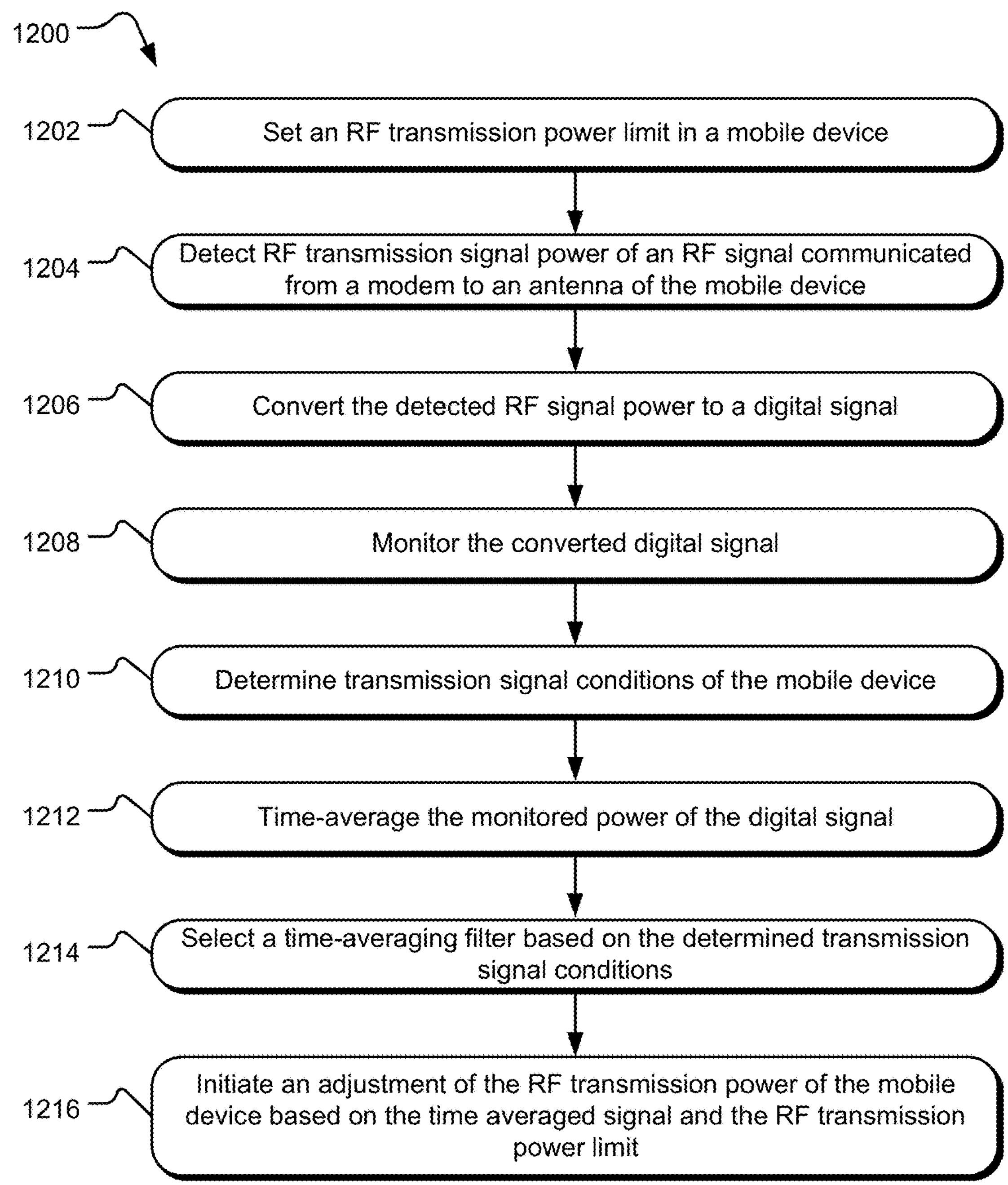
FIG. 12 illustrates example operations for detecting RF power and implementing proximity-independent SAR mitigation.

FIG. 12 illustrates example operations 1200 for detecting RF power and implementing proximity-independent SAR control. The operations may be performed by an RF power detector and/or a SAR controller embodied on a system on chip (SOC), application specific integrated circuit, a microprocessing unit (MU), etc. Instructions for the operations 1200 may be embodied in instructions stored on a processor readable storage media. A setting operation 1202 sets an RF transmission power limit in a mobile device. The RF transmission power limit may be set independent of detection of proximity of an object to an antenna of the device. The limit may be static and/or dependent on SAR legal limit thresholds. A detecting operation 1204 detects an RF transmission signal power of an RF signal communicated from a modem to an antenna of the mobile device. The detecting operation 1204 may be performed by a detector which may utilize a capacitive tap or a directional coupler. It should be understood that the forward power from the modem to the antenna is detected and not the reflected power from impedance mismatches between the antenna and the transmission line. A converting operation 1206 converts the detected RF signal power to a digital signal. The converting operation 1206 may be performed by an analog to digital converter (ADC).

A monitoring operation 1208 monitors the converted digital signal. A determining operation 1210 determines transmission signals conditions (e.g., context) of the mobile device. The determining operation 1210 may be performed by comparing the detected (converted) RF signal power to stored transmission power contexts. Such transmission power contexts may include high transmission power contexts (e.g., file transmission), medium transmission power contexts (e.g., VOIP call), and low transmission power contexts (e.g., passive transmission). An averaging operation 1212 time averages the monitored digital signal using the selected averaging scheme.

A selecting operation 1214 selects a time averaging filter based on the determined transmission signal conditions. The time averaging scheme corresponds to the determined context. For example, a fast averaging scheme may be utilized to time average a high transmission power context to take advantage of the many dips in transmission power. A slow averaging scheme may be utilized in a low transmission power context to take advantage of periods of low (e.g., almost zero) transmission power. The selection of the averaging scheme may include selecting filters/filter coefficients. An initiating operation 1216 initiates an adjustment of the RF transmission power of the mobile device based on the time averaged signal (according to the selected filter) and the RF transmission power limit. The initiating operation 1216 may utilize the current time averaged transmission power to determine if/when the transmission power may exceed the set RF transmission power limit. Furthermore, an amount of buffer in the RF transmission power may be considered. The operations 1200 may be performed in real-time and as such, the time average and RF transmission power may be determined on a moving time-window basis.

The transmission contexts may include different transmission patterns which can be constructed by a set of signal transmission characteristics that are combined based on pre-stored knowledge of a transmission technology (e.g. LTE) to determine how best to produce an attenuation profile that is optimal for OTA wireless operations while keeping the FCC average satisfied. The outcome (e.g., determined context) is then used to determine which type of filter averaging will be used for the next set of attenuation decisions, the type of filter used and its associated filter coefficients. In addition to producing an adjustment value, the combined logic of such an overall operation takes into account setting aside certain transmission budgets that can be set aside intelligently for anticipating future needs where a high-power period might be required.

It should be understood that the described operations 1204, 1206, 1208, 1210, 1212, and 1214 may be performed continuously or periodically, repeating as transmission power monitoring continues. Further, the operation 1216 may be performed whenever the time-averaged signal and the RF transmission power trigger an RF transmission power adjustment instruction.

Figure 13:
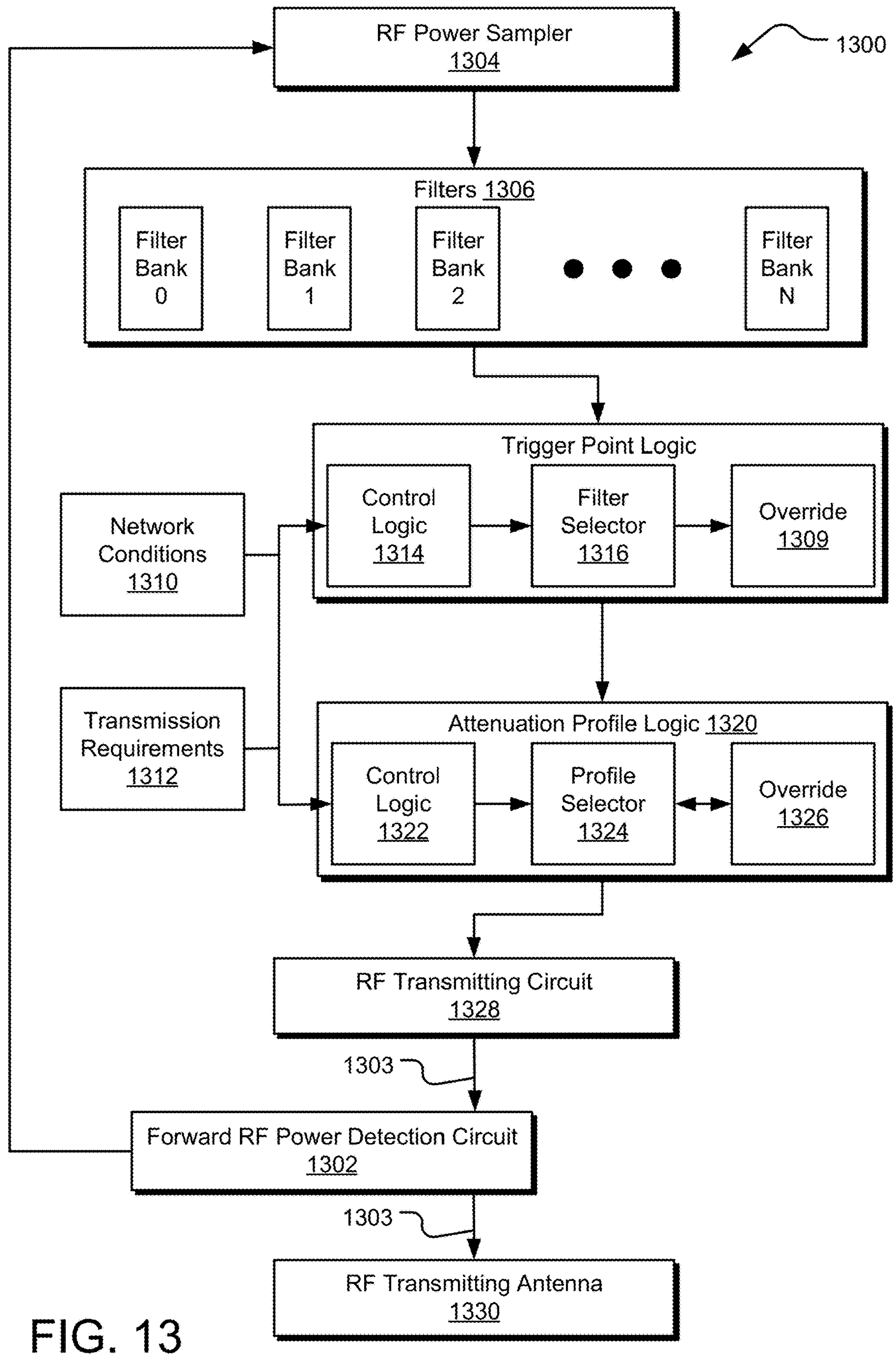
FIG. 13 illustrates an example proximity-independent SAR mitigation framework.

FIG. 13 illustrates an example proximity-independent SAR mitigation framework 1300. A forward RF power detection circuit 1302 monitors the forward RF power supplied by an RF transmitting circuit 1328 (e.g., in a modem) to an RF transmitting antenna 1330 via an RF transmission line coupling 1303. An RF power sampler 1304 samples the monitored forward RF power and provides samples forward power samples to filters 1306, including filter bank 0 through filter bank N. Each filter bank filters at a different cut-off frequency than another filter bank and therefore applies a different average power period to the samples (e.g., averaging the forward RF power over a different average power period).

The filters 1306 issue a trigger for each filter that satisfies the forward RF power adjustment condition. Trigger point logic 1308 receives the triggers, selecting one or more triggers based on inputs including without limitation network conditions 1310 and/or transmission requirements 1312. Control logic 1314 of the trigger point logic 1308 processes the inputs and passes the processed inputs to a filter selector 1316, which selects the filter from which to accept a trigger at any specific point in time, based on the processed inputs. Additionally, override logic 1309 may override a filtered trigger (e.g., if unfiltered samples of the monitored forward RF power risks breaching the SAR limit within the regulatory rolling time window, the override logic 1309 may simply trigger an immediate adjustment, irrespective of any filter-based average power period).

Attenuation profile logic 1320 receives triggers from the selected filters and, based on inputs including without limitation network conditions 1310 and transmission requirements 1312, applies an attenuation profile, which specifies an attenuation duration and potentially incremental attenuation events and magnitudes during the attenuation duration. See, e.g., FIGS. 14-17 for example attenuation profiles. Control logic 1322 of the Attenuation profile logic 1320 processes the inputs and passes the processed inputs to a profile selector 1324, which selects an appropriate attenuation profile for the processed inputs. For example, in a high transmit activity scenario (e.g., a file download), the attenuation profile may be more dramatic and/or abrupt than in a low transmit activity scenario (e.g., a VOIP call). The profile selector 1324 also sends power adjustment instructions to the RF transmitting circuit 1328 to adjust power supplied to the RF transmitting antenna 1330.

Additionally, override logic 1326 may override an input-dependent attenuation profile (e.g., if the monitored forward RF power risks breaching the SAR limit within the regulatory rolling time window, the override logic 1326 may simply terminate transmission power for a period of time).

Figure 14:
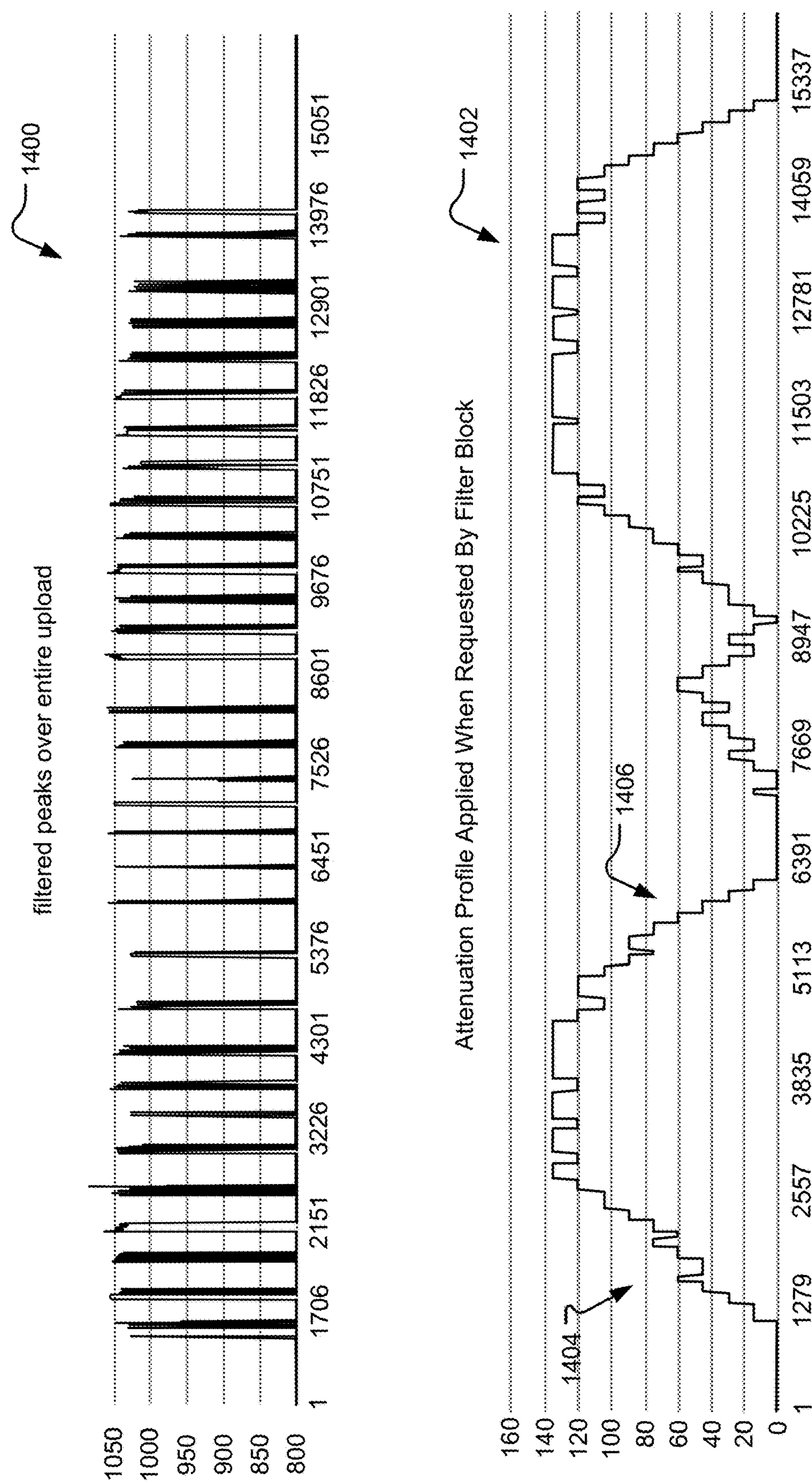
FIG. 14 illustrates an example attenuation profile applicable by control logic for proximity-independent SAR mitigation.

FIG. 14 illustrates an example attenuation profile 1402 applicable by control logic for proximity-independent SAR mitigation. In one implementation, a time-averaging scheme that relies on monitoring the power levels at the antenna(s) over an average time period. Various filters may be used to filter monitored power levels, with each filter (or filter bank) averaging over its own average power period. By averaging power samples received from a detector using a set of dynamically selected filters, back off decisions (e.g., power attenuation decisions) may be determined using a mix of variant filter taps based on the total transmit time, total power average, signal conditions, SAR limits, technology factors, reserved SAR headroom, filter flush based on SAR time average (e.g. within an FCC allowed rolling time window), and many other related variables. Reserved SAR headroom is considered for total power budget spending to account for and guarantee of critical over the air (OTA) transmit events.

In some implementations, recursive averaging techniques are used. In such implementations, a slow averaging filter (e.g., passing lower frequency samples) is used in low transmission modes (e.g., a VOIP call) while a faster averaging filter (e.g., also passing higher frequency samples) is used in high transmission modes (e.g., uploading a large data file). Filter buffers may be flushed at selected periods (e.g., when maximum averaging periods are reached or other system conditions mandate it). In both slow averaging and fast averaging, SAR headroom may be reserved by forcing transmission power adjustment periodically if conditions allow it (e.g. more likely in a fast running average). Many other averaging filters may be employed within the range set by the "fast" and "slow" averaging filters.

A decision counter, which may comprise a part of the SAR controller described above, determines a transmission context (e.g., based on one or more signal conditions) based on the pre-determined and dynamically-determined patterns. For example, pre-determined patterns for file uploads, VOIP calls, web browsing, passive data transmission, and other types of data transmission contexts may be stored in memory. Dynamically-determined patterns may include without limitation patterns learned based on feedback about signal conditions from a base station, etc. These patterns may vary based on the distance between a device and a tower, which may be known by the device/system disclosed herein. The decision counter may compare detected power on the modem-to-antenna transmission line coupling to the pre-determined powers to determine the transmission context. Based on the determined context, an averaging scheme (e.g., filters) is selected to determine the average transmission power.

A slow averaging scheme is selected for a low transmission context (e.g., a "good" signal condition, a low transmission activity). A "medium" averaging scheme is selected for a determined moderate transmission context. A fast averaging scheme is selected for a high transmission context (e.g., a "bad" signal condition, a high transmission activity). It should be understood that more than the three illustrated transmission contexts may be determined and that different averaging schemes may correspond to such contexts. Furthermore, it should be understood that the system may, in real-time, determine a change in context, and thus the averaging scheme (e.g., applied filters) may change.

As discussed, different attenuation profiles at any particular time may be applied to forward RF power adjustment event, depending on the inputs such as network conditions and/or transmission requirements. The plot 1400 depicts actual RF transmission power over time (subject to differing levels of attenuation).

The attenuation profile 1402 depicts the incremental levels of attenuation applied to the actual RF transmission power over time, responsive to triggering of a forward RF power adjustment event and selection of the attenuation profile. The edge 1404 generally depicts an incremental increase in attenuation magnitude over time, contributing to a decrease in the magnitude of actual RF transmission power spikes over time. The edge 1406 generally depicts an incremental decrease in attenuation magnitude over time, contributing to an increase in the magnitude of actual RF transmission power spikes over time.

Figure 15:
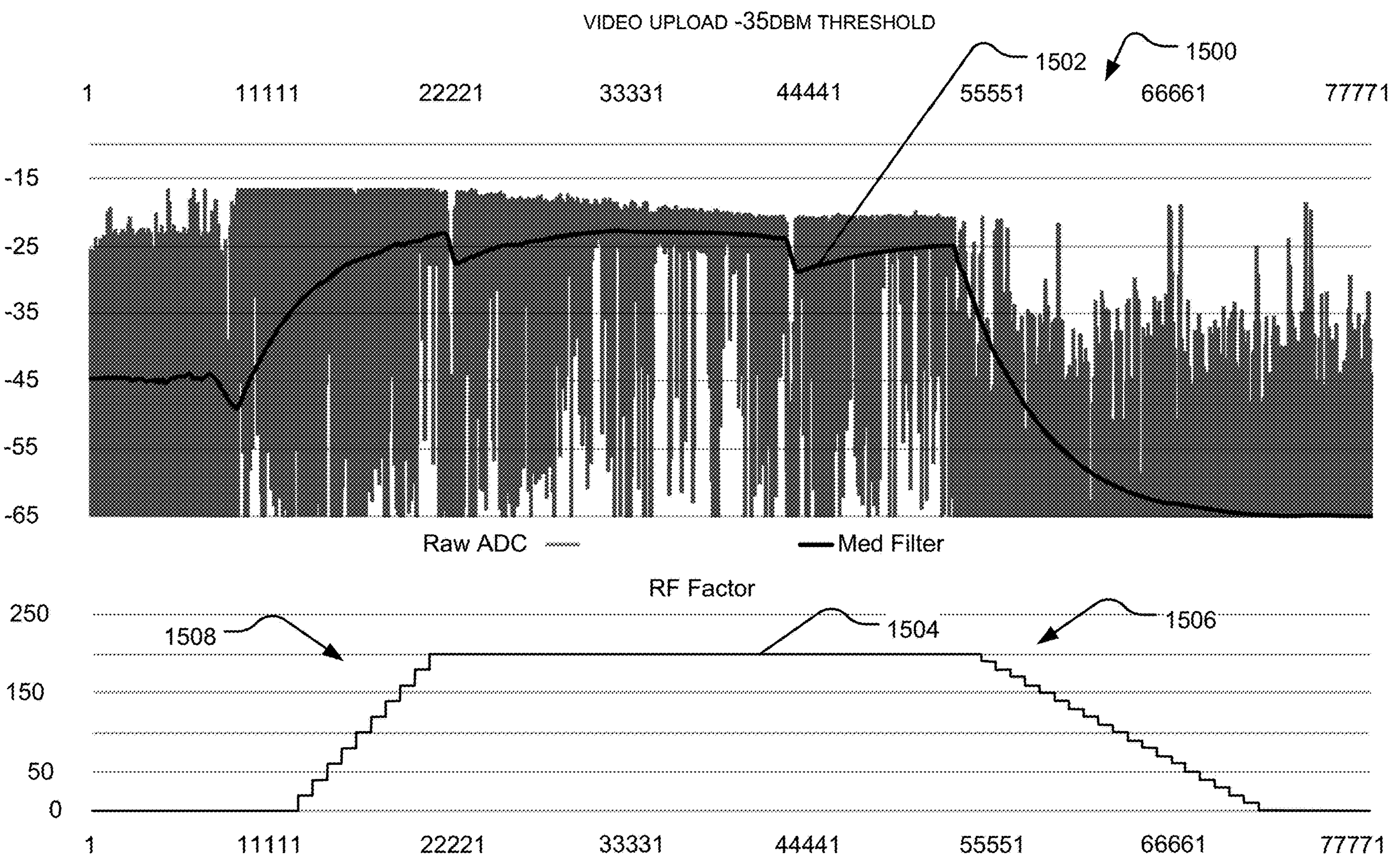
FIG. 15 illustrates an example attenuation profile applicable by control logic for proximity-independent SAR mitigation using a medium filter.

FIG. 15 illustrates an example attenuation profile applicable by control logic for proximity-independent SAR mitigation using a medium filter. As discussed, different attenuation profiles at any particular time may be applied to a forward RF power adjustment event, depending on the inputs such as network conditions and/or transmission requirements. The plot 1500 depicts actual RF transmission power over time of high transmission activity (subject to differing levels of attenuation). The line 1502 depicts average power on a modem-to-antenna transmission line coupling, as monitored by a medium averaging filter. In the scenario presented in FIG. 15, the fast average filter exhibits an average power period that is smaller than the rolling time window specified by SAR regulations.

The attenuation profile 1504 depicts the incremental levels of attenuation applied to the actual RF transmission power over time, responsive to triggering of a forward RF power adjustment event by the medium averaging filter and selection of the attenuation profile. In the illustrated scenario, when the average power monitored during an average power period by the medium average filter exceeds a threshold (e.g., −35 dbm in this scenario), an RF power adjustment trigger signal is activated to adjust the RF power supplied to the antenna. The edge 1506 generally depicts an incremental increase in attenuation magnitude over time, contributing to a decrease in the magnitude of actual RF transmission power spikes over time. The edge 1508 generally depicts an incremental decrease in attenuation magnitude over time, contributing an increase in the magnitude of actual RF transmission power spikes over time.

In some implementations, a hysteresis is introduced when the average power exceeds a threshold. The hysteresis delays the RF power adjustment trigger signal to allow confirmation that the threshold-exceeding activity is not an anomalous event. For example, if the average power monitored during an average power period by the medium average filter still exceeds the threshold at the end of the hysteresis delay, then the trigger condition is confirmed, and the RF power adjustment trigger is activated to adjust the RF power supplied to the antenna. A hysteresis may also be applied to the decrease in attenuations, such that the start of attenuation is delayed until the transmitted average power during the average time period is confirmed to be decreasing below a threshold.

Figure 16:
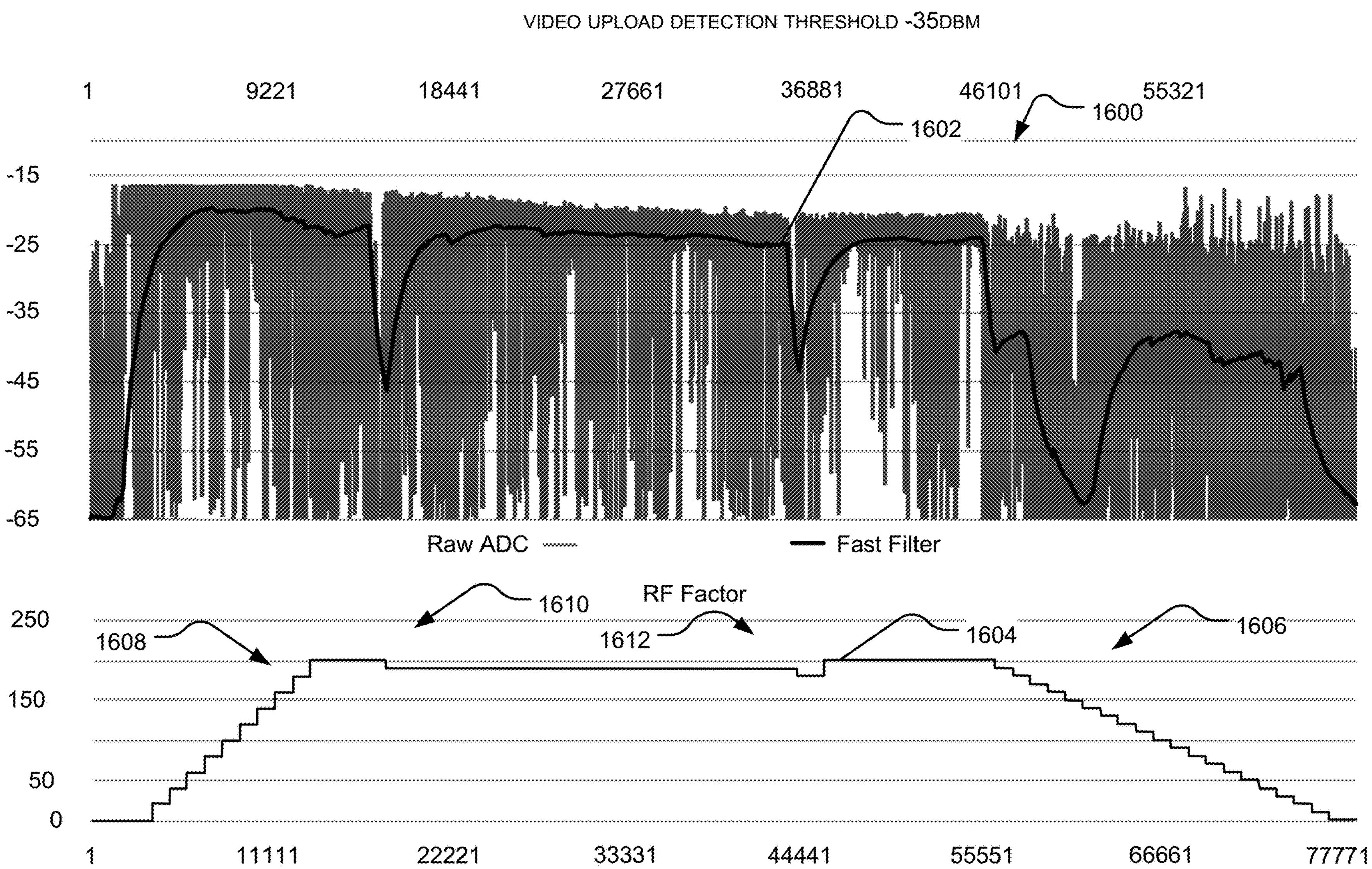
FIG. 16 illustrates an example attenuation profile applicable by control logic for proximity-independent SAR mitigation using a fast filter.

FIG. 16 illustrates an example attenuation profile applicable by control logic for proximity-independent SAR mitigation using a fast filter. As discussed, different attenuation profiles at any particular time may be applied to forward RF power adjustment event, depending on the inputs such as network conditions and/or transmission requirements. The plot 1600 depicts actual RF transmission power over time of high transmission activity (subject to differing levels of attenuation). The line 1602 depicts average power on a modem-to-antenna transmission line coupling, as monitored by a fast averaging filter. In the scenario presented in FIG. 16, the fast average filter exhibits an average power period that is smaller than the rolling time window specified by SAR regulations and is also smaller than the average power period over the slow and medium averaging filters.

The attenuation profile 1604 depicts the incremental levels of attenuation applied to the actual RF transmission power over time, responsive to triggering of a forward RF power adjustment event by the fast averaging filter and selection of the attenuation profile. In the illustrated scenario, when the average power monitored during an average power period by the fast average filter exceeds a threshold (e.g., −35 dbm in this scenario), an RF power adjustment trigger signal is activated to adjust the RF power supplied to the antenna. The edge 1606 generally depicts an incremental increase in attenuation magnitude over time, contributing to a decrease in the magnitude of actual RF transmission power spikes over time. The edge 1608 generally depicts an incremental decrease in attenuation magnitude over time, contributing an increase in the magnitude of actual RF transmission power spikes over time.

In some implementations, a hysteresis is introduced when the average power exceeds a threshold. The hysteresis delays the RF power adjustment trigger signal to allow confirmation that the threshold-exceeding activity is not an anomalous event. For example, if the average power monitored during an average power period by the medium average filter still exceeds the threshold at the end of the hysteresis delay, then the trigger condition is confirmed, and the RF power adjustment trigger is activated to adjust the RF power supplied to the antenna. A hysteresis may also be applied to the decrease in attenuations, such that the start of attenuation is delayed until the transmitted average power during the average time period is confirmed to be decreasing below a threshold.

Figure 17:
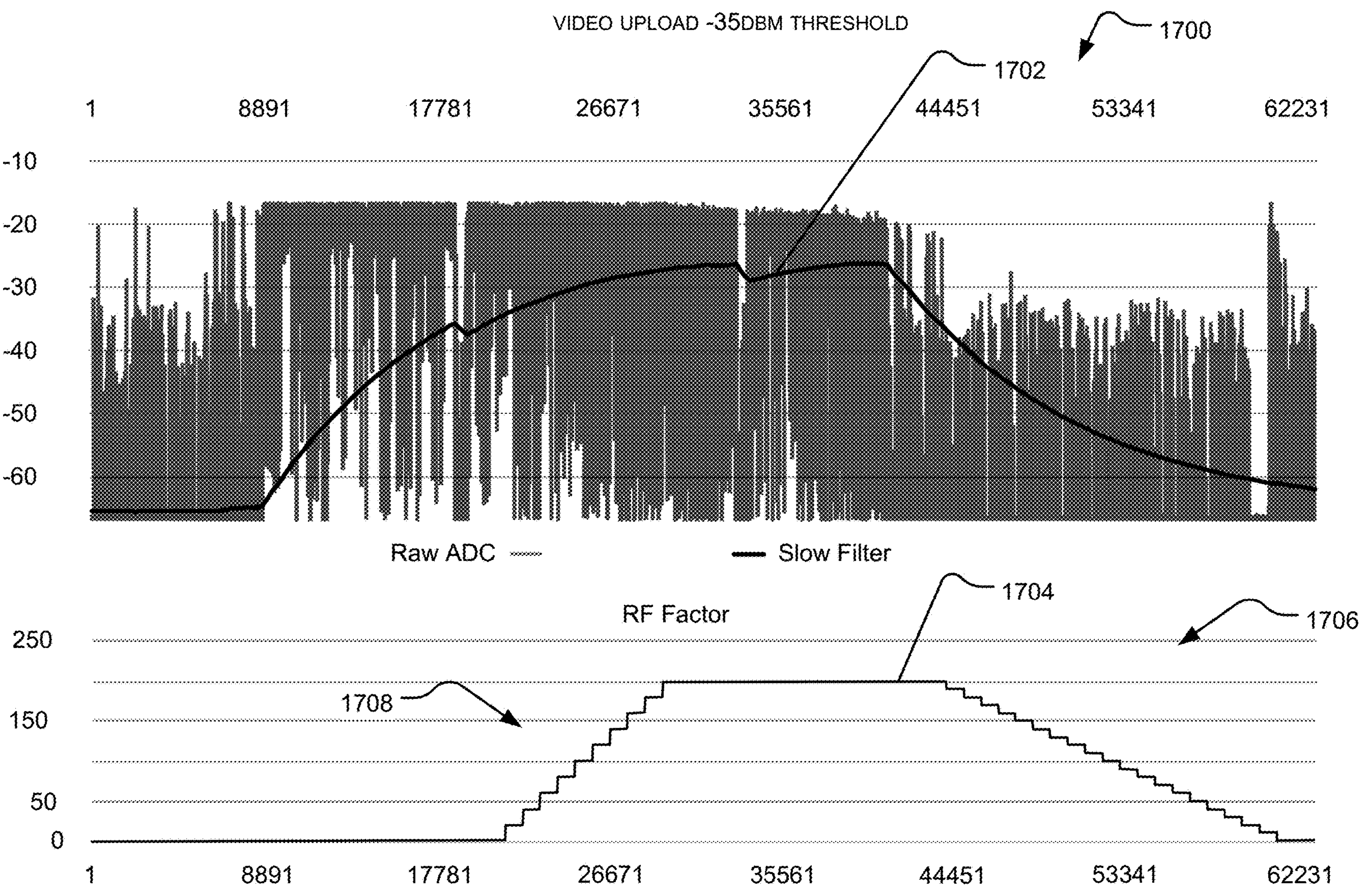
FIG. 17 illustrates an example attenuation profile applicable by control logic for proximity-independent SAR mitigation using a slow filter.

FIG. 17 illustrates an example attenuation profile applicable by control logic for proximity-independent SAR mitigation using a slow filter. As discussed, different attenuation profiles at any particular time may be applied to forward RF power adjustment event, depending on the inputs such as network conditions and/or transmission requirements. The plot 1700 depicts actual RF transmission power over time of high transmission activity (subject to differing levels of attenuation). The line 1702 depicts average power on a modem-to-antenna transmission line coupling, as monitored by a slow averaging filter. In the scenario presented in FIG. 17, the slow average filter exhibits an average power period that is about the same as the rolling time window specified by SAR regulations.

The attenuation profile 1704 depicts the incremental levels of attenuation applied to the actual RF transmission power over time, responsive to triggering of a forward RF power adjustment event by the slow averaging filter and selection of the attenuation profile. In the illustrated scenario, when the average power monitored during an average power period by the fast average filter exceeds a threshold (e.g., −35 dbm in this scenario), an RF power adjustment trigger signal is activated to adjust the RF power supplied to the antenna. The edge 1706 generally depicts an incremental increase in attenuation magnitude over time, contributing to a decrease in the magnitude of actual RF transmission power spikes over time. The edge 1708 generally depicts an incremental decrease in attenuation magnitude over time, contributing an increase in the magnitude of actual RF transmission power spikes over time.

In some implementations, a hysteresis is introduced when the average power exceeds a threshold. The hysteresis delays the RF power adjustment trigger signal to allow confirmation that the threshold-exceeding activity is not an anomalous event. For example, if the average power monitored during an average power period by the medium average filter still exceeds the threshold at the end of the hysteresis delay, then the trigger condition is confirmed, and the RF power adjustment trigger is activated to adjust the RF power supplied to the antenna. A hysteresis may also be applied to the decrease in attenuations, such that the start of attenuation is delayed until the transmitted average power during the average time period is confirmed to be decreasing below a threshold.

It should be understood that RF transmission power limits or thresholds, attenuation profiles, hysteresis values, average power periods, rolling time windows, etc. may be programmable or otherwise adjustable before or during operation of the SAR mitigation process.

Figure 18:
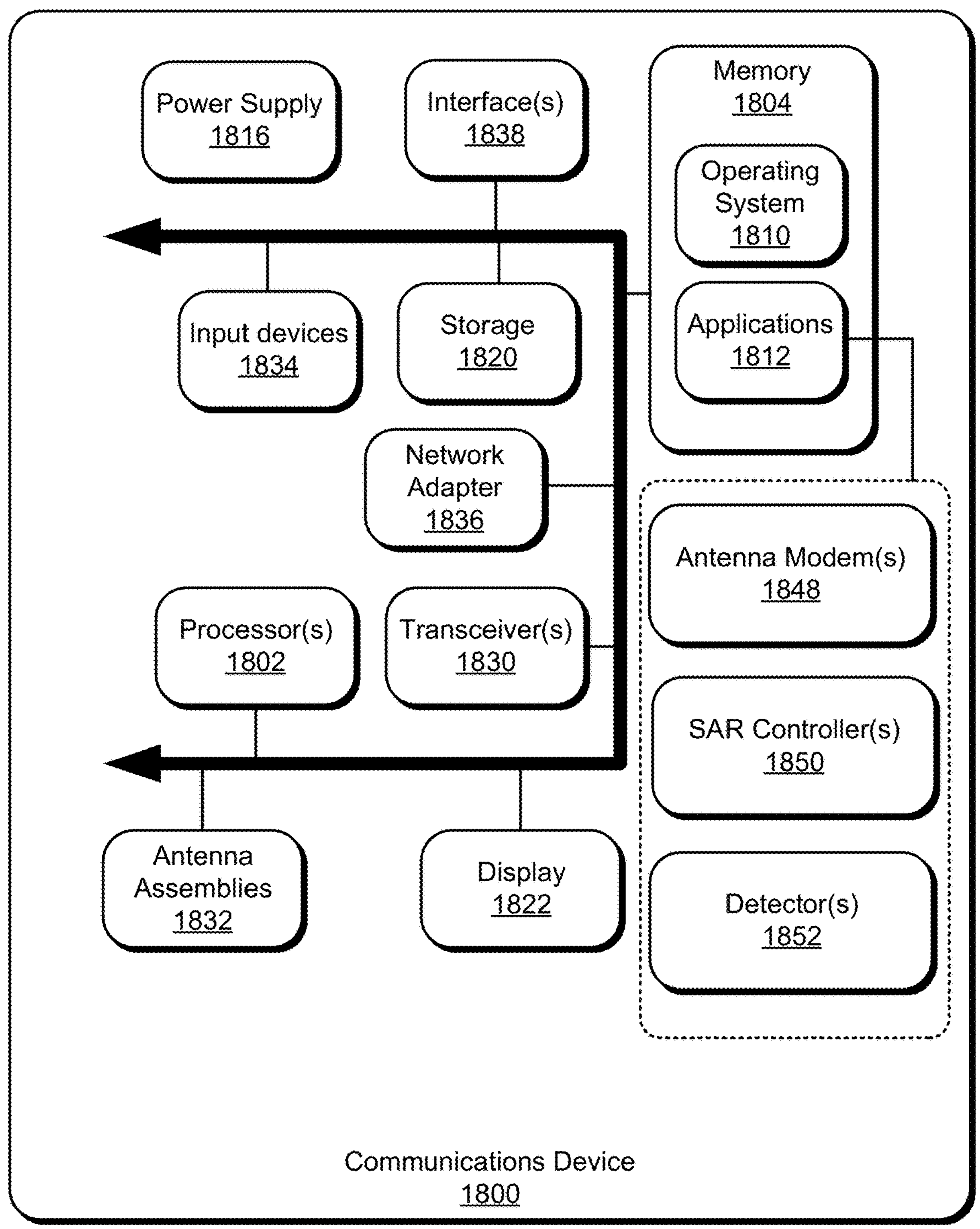
FIG. 18 illustrates an example system that may be useful in implementing the described technology.

FIG. 18 illustrates an example system (labeled as a communications device 1800) that may be useful in implementing the described technology. The communications device 1800 may be a client device such as a laptop, mobile device, desktop, tablet, or a server/cloud device. The communications device 1800 includes one or more processor(s) 1802, and a memory 1804. The memory 1804 generally includes both volatile memory (e.g., RAM) and non-volatile memory (e.g., flash memory). An operating system 1810 resides in the memory 1804 and is executed by the processor(s) 1802.

One or more application programs 1812 modules or segments, such as an antenna module(s) 1848, a SAR controller(s) 1850, and/or a detector(s) 1852 are loaded in the memory 1804 and/or storage 1820 and executed by the processor(s) 1802. Data such as signal context patterns, SAR RF power thresholds, conditions, etc. may be stored in the memory 1804 or storage 1820 and may be retrievable by the processor(s) 1802 for use in the by the antenna modules 1848, the SAR controllers 1850, the detectors 1852, etc. The storage 1820 may be local to the communications device 1800 or may be remote and communicatively connected to the communications device 1800 and may include another server. The storage 1820 may store resources that are requestable by client devices (not shown).

The communications device 1800 includes a power supply 1816, which is powered by one or more batteries or other power sources and which provides power to other components of the communications device 1800. The power supply 1816 may also be connected to an external power source that overrides or recharges the built-in batteries or other power sources.

The communications device 1800 may include one or more communication transceivers 1830 which may be connected to one or more antenna assemblies 1832 to provide network connectivity (e.g., mobile phone network, Wi-Fi®, Bluetooth®, etc.) to one or more other servers and/or client devices (e.g., mobile devices, desktop computers, or laptop computers). The communications device 1800 may further include a network adapter 1836, which is a type of communication device. The communications device 1800 may use the adapter and any other types of communication devices for establishing connections over a wide-area network (WAN) or local-area network (LAN). It should be appreciated that the network connections shown are exemplary and that other communications devices and means for establishing a communications link between the communications device 1800 and other devices may be used. The one or more antenna assemblies 1832 may include isolators, circulators, capacitive taps, detectors, pads, analog to digital converters, etc.

The communications device 1800 may include one or more input devices 1834 such that a user may enter commands and information (e.g., a keyboard or mouse). These and other input devices may be coupled to the server by one or more interfaces 1838 such as a serial port interface, parallel port, universal serial bus (USB), etc. The communications device 1800 may further include a display 1822 such as a touch screen display.

The communications device 1800 may include a variety of tangible processor-readable storage media and intangible processor-readable communication signals. Tangible processor-readable storage can be embodied by any available media that can be accessed by the communications device 1800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method regulates forward radiofrequency (RF) power supplied by an RF transmitter circuit to an RF transmitting antenna and includes detecting forward RF power supplied by the RF transmitter circuit to the RF transmitting antenna and receiving at multiple filters RF power samples of the supplied forward RF power. Each filter differently filters the received forward power samples to apply a different average power period. Each filter further activates an RF power adjustment trigger signal while a time-averaged forward RF power supplied to the RF transmitting antenna satisfies a forward RF power adjustment condition for the average power period of the filter. The example method also adjusts the forward RF power supplied by the RF transmitter circuit to the RF transmitting antenna based on the RF power adjustment trigger signal.

Another example method of any preceding method further includes selecting one of the multiple filters from which to output the RF power adjustment trigger signal.

Another example method of any preceding method is provided wherein the selecting operation selects one of the multiple filters based on at least one of network conditions and transmission requirements.

Another example method of any preceding method further includes applying an attenuation profile while the RF power adjustment trigger signal is active and the adjusting operation adjusts the forward RF power supplied by the RF transmitter circuit to the RF transmitting antenna according to the attenuation profile.

Another example method of any preceding method is provided wherein the attenuation profile specifies magnitudes of incremental adjustments in forward RF power supplied by the RF transmitter circuit to the RF transmitting antenna.

Another example method of any preceding method is provided wherein the attenuation profile specifies durations of incremental adjustments in forward RF power supplied by the RF transmitter circuit to the RF transmitting antenna.

Another example method of any preceding method is provided wherein the detecting operation includes isolating the forward RF power from reflected RF power in a supply coupling between the RF transmitter circuit and the RF transmitting antenna.

An example radiofrequency (RF) power regulator includes a forward RF power detection circuit operable to detect forward RF power supplied by an RF transmitter circuit to an RF transmitting antenna. An RF power sampler is coupled to the forward RF power detection circuit and provides RF power samples of the supplied forward RF power. Multiple filters are coupled to receive the RF power samples. Each filter differently filters the received forward power samples to apply a different average power period. Each filter further activates an RF power adjustment trigger signal while a time-averaged forward RF power supplied to the RF transmitting antenna satisfies a forward RF power adjustment condition for the average power period of the filter. Forward RF power adjustment logic is coupled to the filters and is operable to adjust the forward RF power supplied by the RF transmitter circuit to the RF transmitting antenna based on the RF power adjustment trigger signal.

Another example RF power regulator of any preceding regulator further includes a filter selector coupled to the multiple filters and operable to select one of the multiple filters from which to output the RF power adjustment trigger signal.

Another example RF power regulator of any preceding regulator is provided wherein the filter selector is operable to select one of the multiple filters based on at least one of network conditions and transmission requirements.

Another example RF power regulator of any preceding regulator further includes an attenuation profile controller operable to apply an attenuation profile while the RF power adjustment trigger signal is active and to adjust the forward RF power supplied by the RF transmitter circuit to the RF transmitting antenna according to the attenuation profile.

Another example RF power regulator of any preceding regulator is provided wherein the attenuation profile specifies magnitudes of incremental adjustments in forward RF power supplied by the RF transmitter circuit to the RF transmitting antenna.

Another example RF power regulator of any preceding regulator is provided wherein the attenuation profile specifies durations of incremental adjustments in forward RF power supplied by the RF transmitter circuit to the RF transmitting antenna.

Another example RF power regulator of any preceding regulator is provided wherein the forward RF power detection circuit includes forward RF power isolation circuitry coupled between the RF transmitter circuit and the RF transmitting antenna and operable to isolate the forward RF power from reflected RF power in a supply coupling between the RF transmitter circuit and the RF transmitting antenna.

Another example RF power regulator of any preceding regulator is provided wherein the forward RF power isolator circuitry includes a directional coupler operable to detect the forward RF power from the supply coupling between the RF transmitter circuit and the RF transmitting antenna.

Another example RF power regulator of any preceding regulator is provided wherein the forward RF power isolator circuitry includes a directional coupler operable to detect the forward RF power from the supply coupling between the RF transmitter circuit and the RF transmitting antenna and a circulator coupled between the directional coupler and the RF transmitting antenna.

Another example RF power regulator of any preceding regulator is provided wherein the forward RF power isolator circuitry includes a capacitive tap operable to detect the forward RF power from the supply coupling between the RF transmitter circuit and the RF transmitting antenna and a circulator coupled between the capacitive tap and the RF transmitting antenna.

Another example RF power regulator of any preceding regulator is provided wherein the forward RF power isolator circuitry includes a directional coupler operable to detect the forward RF power from the supply coupling between the RF transmitter circuit and the RF transmitting antenna and an isolator coupled between the directional coupler and the RF transmitting antenna.

Another example RF power regulator of any preceding regulator is provided wherein the forward RF power isolator circuitry includes a capacitive tap operable to detect the forward RF power from the supply coupling between the RF transmitter circuit and the RF transmitting antenna and an isolator coupled between the capacitive tap and the RF transmitting antenna.

An example communications device includes a radiofrequency (RF) transmitting antenna, an RF transmitter circuit coupled to supply forward RF power to the RF transmitting antenna, a forward RF power detection circuit operable to detect the forward RF power supplied by the RF transmitter circuit to the RF transmitting antenna, an RF power sampler coupled to the forward RF power detection circuit and to provide RF power samples of the supplied forward RF power, and multiple filters coupled to receive the RF power samples. Each filter differently filters the received forward power samples to apply a different average power period. Each filter further activates an RF power adjustment trigger signal while a time-averaged forward RF power supplied to the RF transmitting antenna satisfies a forward RF power adjustment condition for the average power period of the filter. A filter selector is coupled to the multiple filters and is operable to select one of the multiple filters from which to output the RF power adjustment trigger signal based on at least one of network conditions and transmission requirements. Forward RF power adjustment logic is coupled to the filter selector and is operable to adjust the forward RF power supplied by the RF transmitter circuit to the RF transmitting antenna based on the RF power adjustment trigger signal output from the selected filter.

An example system regulates forward radiofrequency (RF) power supplied by an RF transmitter circuit to an RF transmitting antenna and includes means for detecting forward RF power supplied by the RF transmitter circuit to the RF transmitting antenna and means for receiving at multiple filters RF power samples of the supplied forward RF power. Each filter differently filters the received forward power samples to apply a different average power period. Each filter further activates an RF power adjustment trigger signal while a time-averaged forward RF power supplied to the RF transmitting antenna satisfies a forward RF power adjustment condition for the average power period of the filter. The example system also includes means for adjusting the forward RF power supplied by the RF transmitter circuit to the RF transmitting antenna based on the RF power adjustment trigger signal.

Another example system of any preceding system further includes means for selecting one of the multiple filters from which to output the RF power adjustment trigger signal.

Another example system of any preceding system is provided wherein the means for selecting selects one of the multiple filters based on at least one of network conditions and transmission requirements.

Another example system of any preceding system further includes means for applying an attenuation profile while the RF power adjustment trigger signal is active. The means for adjusting adjusts the forward RF power supplied by the RF transmitter circuit to the RF transmitting antenna according to the attenuation profile.

Another example system of any preceding system is provided wherein the attenuation profile specifies magnitudes of incremental adjustments in forward RF power supplied by the RF transmitter circuit to the RF transmitting antenna.

Another example system of any preceding system is provided wherein the attenuation profile specifies durations of incremental adjustments in forward RF power supplied by the RF transmitter circuit to the RF transmitting antenna.

Another example system of any preceding system further includes is provided wherein the means for detecting includes means for isolating the forward RF power from reflected RF power in a supply coupling between the RF transmitter circuit and the RF transmitting antenna.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of regulating forward radiofrequency (RF) power supplied by an RF transmitter circuit to an RF transmitting antenna, the method comprising:

detecting the forward RF power supplied by the RF transmitter circuit to the RF transmitting antenna;

monitoring RF power samples of the supplied forward RF power over at least one average power period;

activating an RF power adjustment trigger signal while a time-averaged forward RF power supplied to the RF transmitting antenna satisfies a forward RF power adjustment condition for the at least one average power period, the forward RF power adjustment condition specifying a relation between the time-averaged forward RF power supplied to the RF transmitting antenna during the at least one average power period and a first predetermined time-averaged power threshold; and adjusting the forward RF power supplied by the RF transmitter circuit to the RF transmitting antenna based on the RF power adjustment trigger signal.

2. The method of claim 1 wherein the at least one average power period includes a plurality of average power periods, wherein the monitoring operation is performed at multiple filters, each filter differently filtering the monitored RF power samples to apply a different average power period of the plurality of average power periods.

3. The method of claim 2 further comprising:

selecting one of the multiple filters from which to output the RF power adjustment trigger signal.

4. The method of claim 3 wherein the selecting operation selects one of the multiple filters based on at least one of network conditions and transmission requirements.

5. The method of claim 1 further comprising:

applying an attenuation profile while the RF power adjustment trigger signal is active, the adjusting operation adjusting the forward RF power supplied by the RF transmitter circuit to the RF transmitting antenna according to the attenuation profile.

6. The method of claim 5 wherein the attenuation profile specifies magnitudes of incremental adjustments in forward RF power supplied by the RF transmitter circuit to the RF transmitting antenna.

7. The method of claim 5 wherein the attenuation profile specifies durations of incremental adjustments in forward RF power supplied by the RF transmitter circuit to the RF transmitting antenna.

8. The method of claim 1 wherein the detecting operation comprises:

isolating the forward RF power from reflected RF power in a supply coupling between the RF transmitter circuit and the RF transmitting antenna.

9. A radiofrequency (RF) power regulator comprising:

a forward RF power detection circuit configured to detect forward RF power supplied by an RF transmitter circuit to an RF transmitting antenna;

an RF power sampler coupled to the forward RF power detection circuit, the RF power sampler configured to provide RF power samples of the supplied forward RF power over at least one average power period;

at least one filter to monitor the RF power samples, the at least one filter activating an RF power adjustment trigger signal while a time-averaged forward RF power supplied to the RF transmitting antenna satisfies a forward RF power adjustment condition for the at least one filter, the forward RF power adjustment condition specifying a relation between the time-averaged forward RF power supplied to the RF transmitting antenna during the at least one average power period and a first predetermined time-averaged power threshold; and forward RF power adjustment logic coupled to the at least one filter and configured to adjust the forward RF power supplied by the RF transmitter circuit to the RF transmitting antenna based on the RF power adjustment trigger signal.

10. The RF power regulator of claim 9 wherein the at least one filter includes a plurality multiple filters, wherein each filter of the multiple filters differently filters the monitored RF power samples to apply a different average power period, and wherein the power regulator further comprises:

a filter selector coupled to the multiple filters and configured to select one of the multiple filters from which to output the RF power adjustment trigger signal.

11. The RF power regulator of claim 10 wherein the filter selector is configured to select one of the multiple filters based on at least one of network conditions and transmission requirements.

12. The RF power regulator of claim 9 further comprising:

an attenuation profile controller configured to apply an attenuation profile while the RF power adjustment trigger signal is active and to adjust the forward RF power supplied by the RF transmitter circuit to the RF transmitting antenna according to the attenuation profile.

13. The RF power regulator of claim 12 wherein the attenuation profile specifies magnitudes of incremental adjustments or durations of incremental adjustments in forward RF power supplied by the RF transmitter circuit to the RF transmitting antenna.

14. The RF power regulator of claim 9 wherein the forward RF power detection circuit comprises:

forward RF power isolation circuitry coupled between the RF transmitter circuit and the RF transmitting antenna and configured to isolate the forward RF power from reflected RF power in a supply coupling between the RF transmitter circuit and the RF transmitting antenna.

15. The RF power regulator of claim 14 wherein the forward RF power isolator circuitry comprises:

a directional coupler configured to detect the forward RF power from the supply coupling between the RF transmitter circuit and the RF transmitting antenna.

16. The RF power regulator of claim 14 wherein the forward RF power isolator circuitry comprises:

a directional coupler configured to detect the forward RF power from the supply coupling between the RF transmitter circuit and the RF transmitting antenna; and a circulator coupled between the directional coupler and the RF transmitting antenna.

17. The power regulator of claim 9, wherein the relation is the time-averaged forward RF power supplied to the RF transmitting antenna reaching or exceeding the first predetermined time-averaged power threshold, and wherein the forward RF power adjustment logic is configured to adjust the forward RF power supplied by the RF transmitter circuit to the RF transmitting antenna based on the RF power adjustment trigger signal by reducing the forward RF power supplied by the RF transmitter circuit to the RF transmitting antenna.

18. The power regulator of claim 9, wherein the relation is the time-averaged forward RF power supplied to the RF transmitting antenna being less than the first predetermined time-averaged power threshold, and wherein the forward RF power adjustment logic is configured to adjust the forward RF power supplied by the RF transmitter circuit to the RF transmitting antenna based on the RF power adjustment trigger signal by increasing the forward RF power supplied by the RF transmitter circuit to the RF transmitting antenna.

19. The power regulator of claim 9, wherein the first predetermined time-averaged power threshold is selected to be less than a second predetermined time-averaged power threshold to limit the time-averaged forward RF power supplied to the RF transmitting antenna from exceeding the second predetermined time-averaged power threshold.

20. One or more tangible processor-readable storage media devices embodied with instructions for executing on one or more processors and circuits of a computing device a process comprising:

detecting forward radiofrequency (RF) power supplied by a RF transmitter circuit to an RF transmitting antenna;

monitoring RF power samples of the supplied forward RF power over at least one average power period;

activating an RF power adjustment trigger signal while a time-averaged forward RF power supplied to the RF transmitting antenna satisfies a forward RF power adjustment condition for the at least one average power period, the forward RF power adjustment condition specifying a relation between the time-averaged forward RF power supplied to the RF transmitting antenna during the at least one average power period and a first predetermined time-averaged power threshold; and adjusting the forward RF power supplied by the RF transmitter circuit to the RF transmitting antenna based on the RF power adjustment trigger signal.

* * * * *